（12）United States Patent
Naito et al.

(10) Patent No.: US 12,151,586 B2
(45) Date of Patent: Nov. 26, 2024

(54) ELECTRIC CART USE MANAGEMENT DEVICE, USE MANAGEMENT SYSTEM, COMPUTER-READABLE RECORDING MEDIUM, AND ELECTRIC CART USE MANAGEMENT METHOD

(71) Applicant: Panasonic Intellectual Property Corporation of America, Torrance, CA (US)

(72) Inventors: Eiichi Naito, Kyoto (JP); Kohsuke Yoshioka, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 204 days.

(21) Appl. No.: 17/881,314

(22) Filed: Aug. 4, 2022

(65) Prior Publication Data

US 2022/0371470 A1 Nov. 24, 2022

Related U.S. Application Data

(63) Continuation of application No. PCT/JP2020/048932, filed on Dec. 25, 2020.

(30) Foreign Application Priority Data

May 26, 2020 (JP) .................................. 2020-091439

(51) Int. Cl.
*B60L 58/12* (2019.01)
*B60L 15/20* (2006.01)
(Continued)

(52) U.S. Cl.
CPC ............... *B60L 58/12* (2019.02); *B60L 15/20* (2013.01); *B60L 50/60* (2019.02);
(Continued)

(58) Field of Classification Search
CPC .......... B60L 58/12; B60L 15/20; B60L 50/60; H01M 10/425; H01M 10/446;
(Continued)

(56) References Cited

U.S. PATENT DOCUMENTS 10,612,933 B1 * 4/2020 Ledet ................. G01C 21/3469
2017/0098176 A1 * 4/2017 Hirose .................. G06Q 10/20

FOREIGN PATENT DOCUMENTS

| JP | 2003-219503 | 7/2003 |
|----|-------------|--------|
| JP | 2009-225564 | 10/2009 |

(Continued)

OTHER PUBLICATIONS

International Search Report issued in International Patent Application No. PCT/JP2020/048932, dated Mar. 23, 2021, along with an English translation thereof.

*Primary Examiner* — Isaac G Smith
(74) *Attorney, Agent, or Firm* — GREENBLUM & BERNSTEIN, P.L.C.

(57) ABSTRACT

A use management device includes: a traveling information acquisition part which acquires subsequent prospective traveling information about an electrically driven cart; a remaining amount information acquisition part which acquires remaining amount information about a battery; a determination section which determines, based on the prospective traveling information and the remaining amount information, whether charging of the battery is necessary; and a control section which executes a permission control of permitting a traveling motor to drive when the determination section determines that the charging of the battery is unnecessary, and executes a forbidding control of forbidding the traveling motor from driving when the determination section determines that the charging of the battery is necessary.

14 Claims, 23 Drawing Sheets

(51) Int. Cl.
  *B60L 50/60* (2019.01)
  *H01M 10/42* (2006.01)
  *H01M 10/44* (2006.01)
  *H01M 10/48* (2006.01)
  *H02J 7/00* (2006.01)

(52) U.S. Cl.
  CPC ....... *H01M 10/425* (2013.01); *H01M 10/446* (2013.01); *H01M 10/48* (2013.01); *H02J 7/0048* (2020.01); *H02J 7/0063* (2013.01); *H02J 7/00712* (2020.01); *H01M 2010/4271* (2013.01); *H01M 2010/4278* (2013.01); *H01M 2220/20* (2013.01)

(58) Field of Classification Search
  CPC ......... H01M 10/48; H01M 2010/4278; H01M 2220/20; H02J 7/0048; H02J 7/0063; H02J 7/00712
  USPC .......................................................... 701/22
  See application file for complete search history.

(56) References Cited

FOREIGN PATENT DOCUMENTS

| | | | | |
|---|---|---|---|---|
| JP | 2009225564 | A | * | 10/2009 |
| JP | 2013255361 | A | * | 12/2013 |
| JP | 2014-003868 | | | 1/2014 |
| JP | 2014-143883 | | | 8/2014 |
| KR | 20120041446 | A | * | 5/2012 |

* cited by examiner

FIG.3

| | MONDAY | TUESDAY | WEDNESDAY | THURSDAY | FRIDAY | SATURDAY | SUNDAY |
|---|---|---|---|---|---|---|---|
| MORNING | | ○○CLINIC | | ○○CLINIC | | | |
| AFTERNOON | | | | | | | |
| EVENING | SUPERMARKET | | SUPERMARKET | | SUPERMARKET | | GATHERING |
| NIGHT | | LESSON | | GATHERING | | | |

60

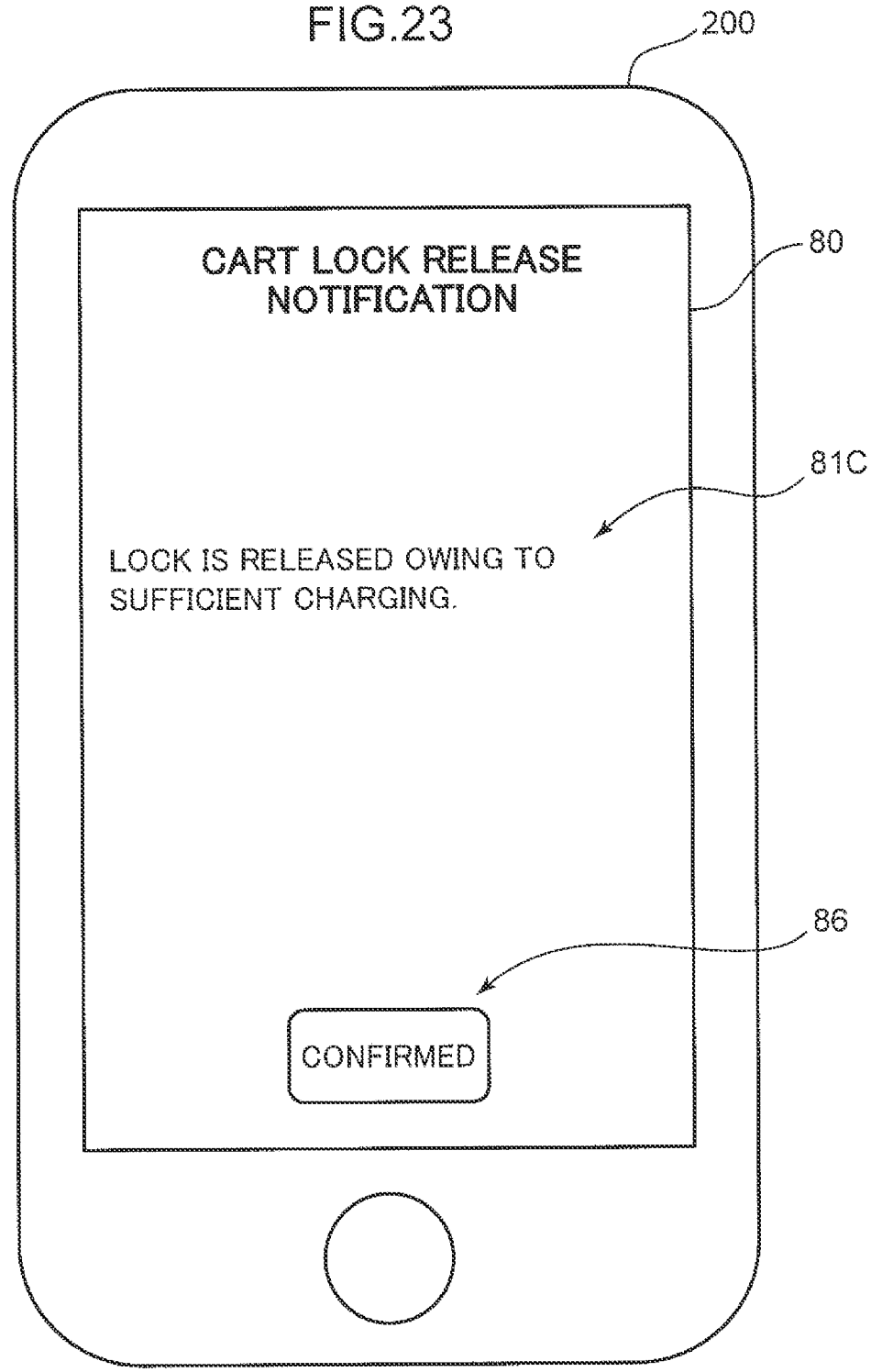

ELECTRIC CART USE MANAGEMENT DEVICE, USE MANAGEMENT SYSTEM, COMPUTER-READABLE RECORDING MEDIUM, AND ELECTRIC CART USE MANAGEMENT METHOD

TECHNICAL FIELD

This disclosure relates to a use management device and a use management system for an electrically driven cart, a computer-readable recording medium recording a program, and a use management method for an electrically driven cart.

BACKGROUND ART

Patent Literature 1 discloses a remote-control system for an electric vehicle. The remote-control system includes: a detector disposed in a predetermined facility like a vehicle charging station; and a remote-control device arranged in a predetermined building communicable with the facility. The detector detects, based on information received from a vehicle, a remaining amount of a battery of the vehicle, and transmits a result of the detection to the remote-control device. The remote-control device sends control information for charging the battery to the vehicle via the facility when the remaining amount of the battery reaches a predetermined threshold or smaller. The vehicle having received the control information executes an operation of charging the battery by using a contactless charger at the facility.

The remote-control system for the electric vehicle as disclosed in Patent Literature 1 requires, as its structural elements, the detector in the facility, the remote-control device in the building, a communication device for the communication between the facility and the building, and another communication device for communication between the vehicle and the facility. Therefore, an attempt to apply the remote-control system to management of a battery of an electrically driven cart, such as a mobility scooter or "senior car" (registered trademark), makes a configuration of the system complicated.

CITATION LIST

Patent Literature

Patent Literature 1: Japanese Unexamined Patent Publication No. 2014-3868

SUMMARY OF INVENTION

This disclosure provides a technology for easily and effectively preventing an electricity shortage of an electrically driven cart.

To solve the aforementioned drawbacks, a use management device according to an aspect of this disclosure is a use management device for an electrically driven cart including a traveling motor driven by an electric power supplied from a battery. The use management device includes: a traveling information acquisition part which acquires subsequent prospective traveling information about the electrically driven cart; a remaining amount information acquisition part which acquires remaining amount information about the battery; a determination section which determines, based on the prospective traveling information and the remaining amount information, whether charging of the battery is necessary; and a control section which executes a permission control of permitting the traveling motor to drive when the determination section determines that the charging is unnecessary, and executes a forbidding control of forbidding the traveling motor from driving when the determination section determines that the charging of the battery is necessary.

BRIEF DESCRIPTION OF DRAWINGS

FIG. 3 shows an example of a movement schedule stored in a memory included in the use management device.

FIG. 23 shows an example of an output state of the notification information from the information notification part.

DESCRIPTION OF EMBODIMENTS

Figure 1:
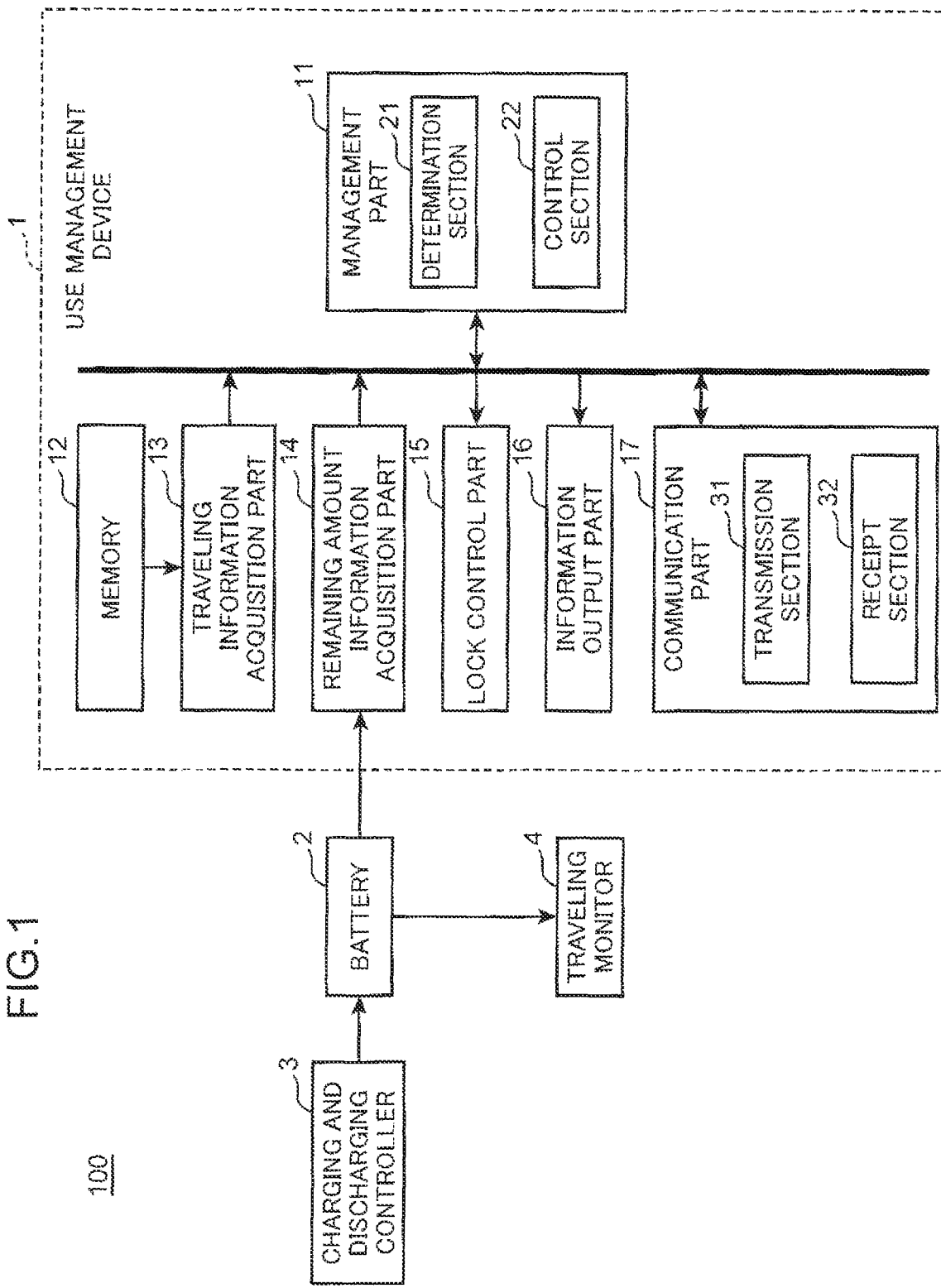
FIG. 1 is a block diagram showing a simplified configuration of a use management device for an electrically driven cart according to an embodiment of this disclosure.

Knowledge Forming the Basis of the Present Disclosure

Electrically driven carts including a senior car (registered trademark) have been widely spreading along with a recent progress of an aging society. Such an electrically driven cart travels in response to a drive of a traveling motor using a battery. Therefore, the battery is required to be charged before a remaining amount of the battery reaches zero and an electricity shortage occurs. The battery of the electrically driven cart is normally charged by connecting a domestic outlet and a main body of the electrically driven cart to each other with a charging cable.

However, an elderly person who uses the electrically driven cart may find it physically burdensome to perform the work of charging the battery by him/herself. Besides, an increase in a battery capacity, an improvement in charging and discharging efficiency, and other factors bring a longer maximum operating time from a fully charged state of the battery. This leads to a decrease in the frequency of charging the battery, and such a decrease would rather cause forgetting of battery charging. An electricity shortage of the electrically driven cart may occur outside due to the forgetting of battery charging, resulting in rendering the electrically driven cart inoperative to travel. Accordingly, a countermeasure against the electricity shortage of the electrically driven cart is important.

Hereinafter, Patent Literature 1 will be discussed. A remote-control system for an electric vehicle as disclosed in Patent Literature 1 includes: a detector disposed in a predetermined facility like a vehicle charging station; and a remote-control device arranged in a predetermined building communicable with the facility. The detector detects, based on information received from a vehicle, a remaining amount of a battery of the vehicle, and transmits a result of the detection to the remote-control device. The remote-control device sends control information for charging the battery to the vehicle via the facility when the remaining amount of the battery reaches a predetermined threshold or smaller. The vehicle having received the control information executes an operation of charging the battery by using a contactless charger at the facility. The remote-control system for the electric vehicle disclosed in Patent Literature 1 automatically charges the battery under a remote control when the remaining amount of the battery reaches the predetermined threshold or smaller. This avoids an occurrence of an electricity shortage caused by forgetting of battery charging by the user in advance. However, the remote-control system has a possibility of the occurrence of the electricity shortage outside when long-distance traveling is started in a state where the remaining amount of the battery is slightly larger than the threshold. This is because an operation of charging the battery is not executed in this state. Further, the system requires, as its structural elements, the detector in the facility, the remote-control device in the building, a communication device for the communication between the facility and the building, and another communication device for a communication between the vehicle and the facility. The system accordingly needs a large-scaled configuration. Therefore, an attempt to apply the remote-control system to management of a battery of an electrically driven cart makes the configuration of the system complicated, and thus results in a cost increase for introducing the system. Furthermore, the aforementioned electrically driven cart is used in a limited living area around the house of a user as transportation in a daily life in many cases unlike the electric vehicle which is used for various purposes including commuting, shopping, and excursions. Hence, a movement pattern including a destination and a day of week is fixed to some extent. Besides, an elderly person mainly uses the electrically driven cart, and thus presumably faces difficulty in coping with an occurrence of the electricity shortage outside. From this perspective, there is a possibility of the occurrence of the electricity shortage attributed to a small remaining amount of the battery. In this case, even a compulsory restriction on outings is necessary.

To overcome the drawbacks, the present inventors have obtained the knowledge that the electricity shortage of the electrically driven cart is easily and effectively preventable by: managing prospective traveling information about an electrically driven cart; determining, based on the prospective traveling information and remaining amount information about a battery, whether charging of the battery is necessary; and forbidding a traveling motor included in the electrically driven cart from driving when the charging is determined to be necessary.

Next, various aspects of the disclosure will be described.

A use management device according to an aspect of this disclosure is a use management device for an electrically driven cart including a traveling motor driven by an electric power supplied from a battery. The use management device includes: a traveling information acquisition part which acquires subsequent prospective traveling information about an electrically driven cart; a remaining amount information acquisition part which acquires remaining amount information about the battery; a determination section which determines, based on the prospective traveling information and the remaining amount information, whether charging of the battery is necessary; and a control section which executes a permission control of permitting the traveling motor to drive when the determination section determines that the charging is unnecessary, and executes a forbidding control of forbidding the traveling motor from driving when the determination section determines that the charging of the battery is necessary.

According to this configuration, the determination section determines, based on the prospective traveling information and the remaining amount information, whether charging of the battery is necessary, and the control section executes the forbidding control of forbidding the traveling motor from driving when the determination section determines that the charging of the battery is necessary. As described above, an occurrence of the electricity shortage of the electrically driven cart outside is easily and effectively preventable by forbidding the traveling motor from driving, and imposing a restriction on outings when the charging of the battery is determined to be necessary, based on the prospective traveling information and the remaining amount information.

In this aspect, the device may further include: a transmission section which transmits a forbidding notification indicating that the control section executes the forbidding control to an external terminal device registered in advance; and a receipt section which receives a release instruction of releasing the forbidding control from the external terminal device. The control section may execute the permission control when the receipt section receives the release instruction.

In this configuration, the forbidding notification is transmitted to the external terminal device (e.g., a portable terminal device of a family member) registered in advance, and thus an owner (e.g., the family member) of the external terminal device having received the forbidding notification can perform the work of charging the battery. Moreover, the external terminal device sends the release instruction at a completion of the charging of the battery. When the receipt section of the electrically driven cart receives the release instruction, the control section executes the permission control. Consequently, the user can use the electrically driven cart.

In the aspect, the transmission section may further transmit, to the external terminal device, a prospective traveling distance in subsequent traveling of the electrically driven cart and a travelable distance based on a current battery remaining amount.

In this configuration, the prospective traveling distance and the travelable distance of the electrically driven cart are transmitted to the external terminal device. The configuration therefore can encourage the owner of the external terminal device to rapidly perform the work of charging the battery by providing the owner with the information thereabout.

In the aspect, the transmission section may further transmit, to the external terminal device, a prospective power consumption amount in subsequent traveling of the electrically driven cart and a current battery remaining amount.

In this configuration, the prospective power consumption amount and the remaining amount of the battery of the electrically driven cart is transmitted to the external terminal device. The configuration therefore can encourage the owner of the external terminal device to rapidly perform the work of charging the battery by providing the owner with the information thereabout.

In the aspect, the control section may execute the permission control when a remaining amount of the battery reaches the prospective power consumption amount or larger in the subsequent traveling of the electrically driven cart, after starting the execution of the forbidding control.

According to this configuration, when the remaining amount of the battery reaches the prospective power consumption amount or larger, the control section executes the permission control whether or not the receipt section of the electrically driven cart receives the release instruction from the external terminal device. The configuration accordingly permits the user to use the electrically driven cart when the battery is sufficiently charged even without receiving the release instruction from the external terminal device due to, for example, a communication error.

In this aspect, the use management device may further include an information output part which outputs notification information indicating that the control section may execute the forbidding control.

According to this configuration, the information output part outputs the notification information indicating that the control section executes the forbidding control. Thus, the user having confirmed the notification information can recognize no malfunction of the electrically driven cart.

In this aspect, the use management device may further include an information storage part which stores movement pattern information created in advance about the electrically driven cart. The traveling information acquisition part may acquire, based on the movement pattern information, the prospective traveling information.

According to this configuration, the traveling information acquisition part acquires, based on the movement pattern information stored in the information storage part, the prospective traveling information. The electrically driven cart is used in a limited living area around the house of a user as transportation in a daily life in many cases. Hence, a movement pattern including a destination and a day of week is fixed to some extent. Consequently, the movement pattern information representing the movement pattern can be created in advance, and the traveling information acquisition part can acquire correct prospective traveling information conforming to the movement pattern of the user with reference to the movement pattern information.

In the aspect, the use management device may further include a predictive model storage part which stores a movement predictive model of the electrically driven cart created in advance. The traveling information acquisition part may acquire, based on current time information and the movement predictive model, the prospective traveling information.

According to this configuration, the traveling information acquisition part acquires, based on the movement predictive model stored in the predictive model storage part, the prospective traveling information. The electrically driven cart is used in a limited living area around the house of the user as transportation in a daily life in many cases. Hence, a movement pattern including a destination and a day of week is fixed to some extent. Consequently, the movement predictive model for predicting the movement pattern can be created through machine learning in advance, and the traveling information acquisition part can acquire correct prospective traveling information conforming to the movement pattern of the user with reference to the movement pattern information.

A use management system according to an aspect of this disclosure is a use management system for an electrically driven cart including a traveling motor driven by an electric power supplied from a battery. The use management system includes: a traveling information acquisition part which acquires subsequent prospective traveling information about the electrically driven cart; a remaining amount information acquisition part which acquires remaining amount information about the battery; a determination section which determines, based on the prospective traveling information and the remaining amount information, whether charging of the battery is necessary; and a control section which executes a permission control of permitting the traveling motor to drive when the determination section determines that the charging is unnecessary, and executes a forbidding control of forbidding the traveling motor from driving when the determination section determines that the charging of the battery is necessary.

According to this configuration, the determination section determines, based on the prospective traveling information and the remaining amount information, whether charging of the battery is necessary, and the control section executes the forbidding control of forbidding the traveling motor from driving when the determination section determines that the charging of the battery is necessary. As described above, an occurrence of the electricity shortage of the electrically driven cart outside is easily and effectively preventable by forbidding the traveling motor from driving, and imposing a restriction on outings when the charging of the battery is determined to be necessary, based on the prospective traveling information and the remaining amount information.

A computer-readable recording medium recording a program according to an aspect of this disclosure causes an information processor mounted on an electrically driven cart including a traveling motor driven by an electric power supplied from a battery to serve as: a traveling information acquisition part which acquires subsequent prospective traveling information about the electrically driven cart; a remaining amount information acquisition part which acquires remaining amount information about the battery; a determination section which determines, based on the prospective traveling information and the remaining amount information, whether charging of the battery is necessary; and a control section which executes a permission control of permitting the traveling motor to drive when the determination section determines that the charging is unnecessary, and executes a forbidding control of forbidding the traveling motor from driving when the determination section determines that the charging of the battery is necessary.

According to this configuration, the determination section determines, based on the prospective traveling information and the remaining amount information, whether charging of the battery is necessary, and the control section executes the forbidding control of forbidding the traveling motor from driving when the determination section determines that the charging of the battery is necessary. As described above, an occurrence of the electricity shortage of the electrically driven cart outside is easily and effectively preventable by forbidding the traveling motor from driving, and imposing a restriction on outings when the charging of the battery is determined to be necessary, based on the prospective traveling information and the remaining amount information.

A use management method according to an aspect of this disclosure is a use management method for an electrically driven cart including a traveling motor driven by an electric power supplied from a battery. The use management method, by an information processor mounted on the electrically driven cart, includes: acquiring subsequent prospective traveling information about the electrically driven cart; acquiring remaining amount information about the battery; determining, based on the prospective traveling information and the remaining amount information, whether charging of the battery is necessary; and executing a permission control of permitting the traveling motor to drive when the charging is determined to be unnecessary, and executing a forbidding control of forbidding the traveling motor from driving when the charging of the battery is determined to be necessary.

According to this configuration, the information processor determines, based on the prospective traveling information and the remaining amount information, whether the charging of the battery is necessary, and executes the forbidding control of forbidding the traveling motor from driving when determining that the charging of the battery is necessary. As described above, an occurrence of the electricity shortage of the electrically driven cart outside is easily and effectively preventable by forbidding the traveling motor from driving, and imposing a restriction on outings when the charging of the battery is determined to be necessary, based on the prospective traveling information and the remaining amount information.

It goes without saying that the computer program according to the aspect of this disclosure is distributable as a computer-readable and nonvolatile recording medium like a CD-ROM, or distributable via a communication network like the Internet.

An embodiment which will be described below represents a specific example of the disclosure. Numeric values, shapes, structural elements, steps, and the order of the steps described below in the embodiment are mere examples, and thus should not be construed to delimit the disclosure. Moreover, structural elements which are not recited in the independent claims each showing the broadest concept among the structural elements in the embodiment are described as selectable structural elements. The respective contents are combinable with each other in the embodiment.

Embodiment

Hereinafter, an embodiment of the disclosure will be described with reference to the accompanying drawings. The elements given the same reference numerals in different drawings are defined to be the same or corresponding elements.

FIG. 1 is a block diagram showing a simplified configuration of a use management device 1 for an electrically driven cart according to an embodiment of this disclosure. The use management device 1 manages an electrically driven cart 100, such as a senior car (registered trademark) or an electric wheel chair. The electrically driven cart 100 includes the use management device 1, a battery 2, a charging and discharging controller 3 serving as a battery controller for controlling charging and discharging operations of the battery 2, and a traveling motor 4 driven by an electric power supplied from the battery 2.

The use management device 1 includes a management part 11, a memory 12, a traveling information acquisition part 13, a remaining amount information acquisition part 14, a lock control part 15, an information output part 16, and a communication part 17. The memory 12 includes a nonvolatile storage device, e.g., a flush memory. The information output part 16 includes LED equipment, a liquid crystal display, or an organic EL display, provided on a manipulation panel of an operator seat of the electrically driven cart 100. However, the information output part 16 may include a speaker which outputs voice information.

The communication part 17 has a transmission section 31 and a receipt section 32. The communication part 17 and an external terminal device 200 registered in advance (FIG. 2) are wirelessly communicable with each other via a specific communication network, such as a public switched telephone network. The external terminal device 200 is, for example, a portable terminal device (smartphone or mobile phone) carried by a family member living together with a user of the electrically driven cart 100. However, the external terminal device 200 may be a stationary terminal device, such as a desktop-type personal computer.

The management part 11 has a determination section 21 and a control section 22. The traveling information acquisition part 13 acquires subsequent prospective traveling information about the electrically driven cart 100. The remaining amount information acquisition part 14 acquires current remaining amount information about the battery 2. The determination section 21 determines, based on the prospective traveling information and the remaining amount information, whether charging of the battery 2 is necessary. The control section 22 executes a permission control (control of allowing the traveling motor 4 to start to drive in response to pushing-down of a power source switch included in the electrically driven cart 100) when the determination section 21 determines that the charging of the battery 2 is unnecessary, and executes a forbidding control (control of keeping the traveling motor 4 from starting to drive even when the power source switch of the electrically driven cart 100 is pushed down) when the determination section 21 determines that the charging of the battery 2 is necessary. Contents of the relevant steps will be described in detail later. The lock control part 15 controls, for example, a switch (not shown) located on a power supply route from the battery 2 to the traveling motor 4 to be turned on or off. The switch is turned on in the permission control and turned off in the forbidding control. Each of the management part 11, the traveling information acquisition part 13, the remaining amount information acquisition part 14, and the lock control part 15 may be established as software when an information processor, e.g., a CPU, executes a computer program read from a non-volatile recording medium, e.g., a ROM, or may be established as hardware by using a dedicated circuit, e.g., an FPGA.

Among the elements of the use management device 1, the memory 12, the traveling information acquisition part 13, and the management part 11 may not be provided in the electrically driven cart 100, but may be provided in an external terminal like a cloud which is communicable with the electrically driven cart 100 instead. In other words, a use management system including the use management device 1 and the external terminal may be configured.

Figure 2:
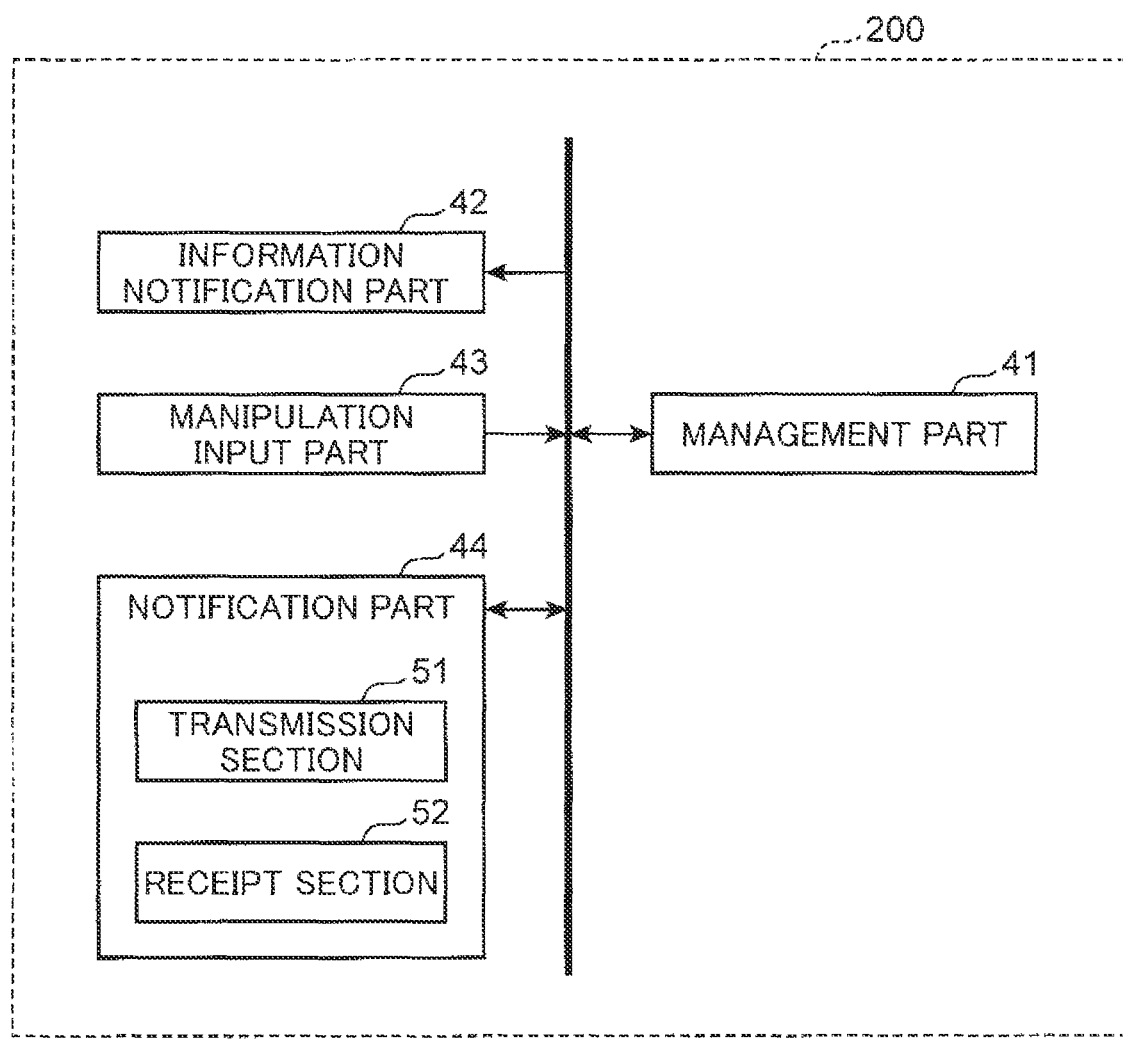
FIG. 2 shows a simplified configuration of an external terminal device.

FIG. 2 shows a simplified configuration of the external terminal device 200. The external terminal device 200 includes dedicated application software installed therein to transmit and receive information to and from the use management device 1. The external terminal device 200 includes a management part 41, an information notification part 42, a manipulation input part 43, and a communication part 44. For instance, the information notification part 42 serves as a liquid crystal display of the external terminal device 200, and the manipulation input part 43 serves as a touch screen of the liquid crystal display. The communication part 44 and the use management device 1 are wirelessly communicable with each other via a specific communication network, such as the public switched telephone network.

FIG. 3 shows an example of a movement schedule 60 stored in the memory 12 of the use management device 1. The movement schedule 60 is created by the user of the electrically driven cart 100 or the owner of the external terminal device 200 in advance, and data related thereto is stored in the memory 12 in advance. In this example, the movement schedule 60 shows one-week event information about use of the electrically driven cart 100 for the user of the electrically driven cart 100 per day of week and time slot. For example, an event of going to a supermarket is set in the evening on each of Monday, Wednesday, and Friday, and another event of vising a clinic is set in the morning on each of Tuesday and Thursday. Furthermore, a total traveling distance per day of week, or a total power consumption amount converted from the distance per day of week is stored in the memory 12 as a part of the movement schedule 60 or in addition to the movement schedule 60. For instance, the dedicated application software is started to automatically calculate a traveling distance and a power consumption amount for each event by designating the house of the user and a destination for each event on map data. The traveling distance and the power consumption amount are collected per day of week, and the total traveling distance and the total power consumption amount per day of week are automatically calculated. The electrically driven cart 100 is used in a limited living area around the house of the user as transportation in a daily life in many cases. Hence, a movement pattern including a destination and a day of week is fixed to some extent. Consequently, the movement schedule 60 representing the movement pattern can be created in advance.

Figure 4:
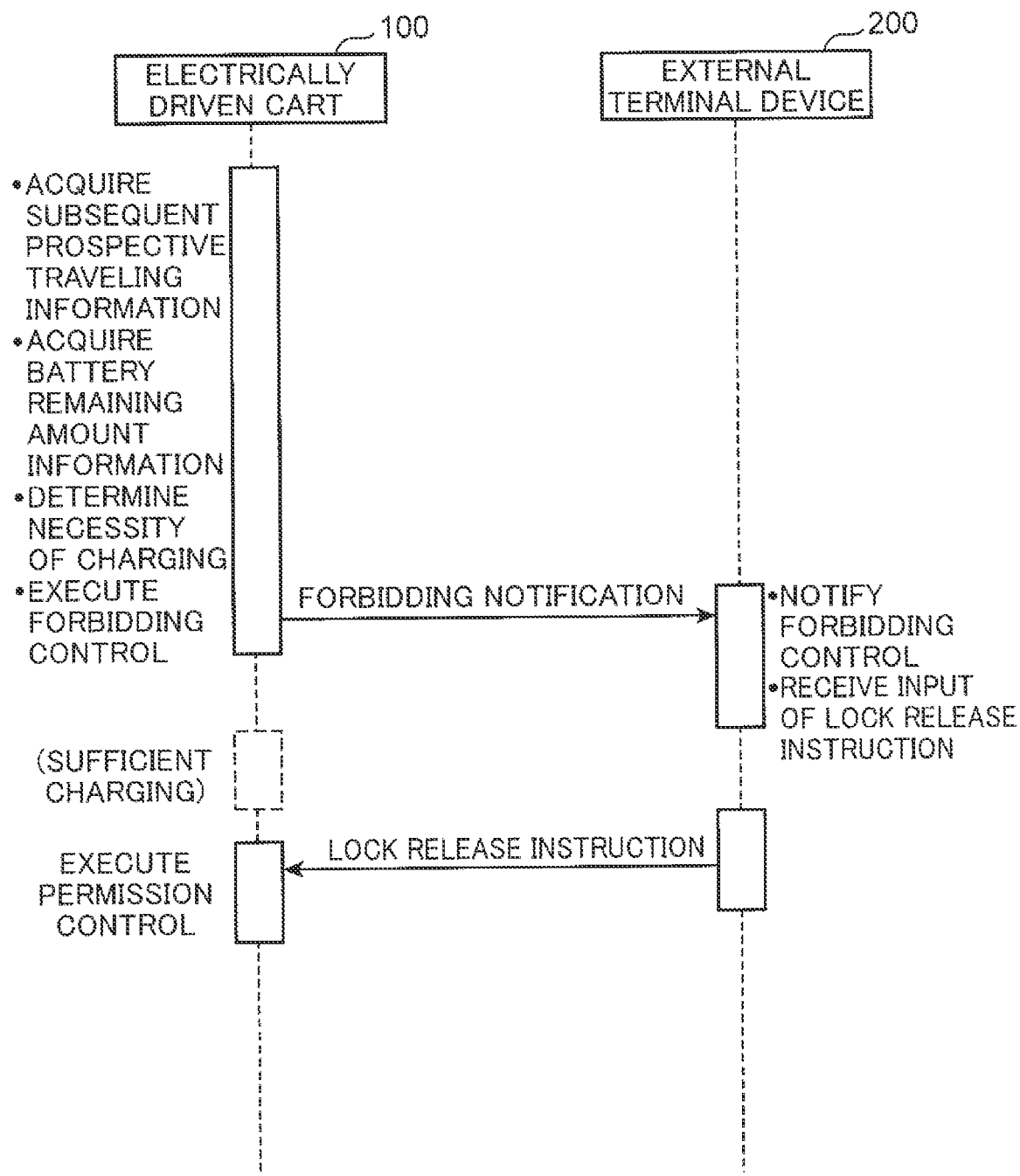
FIG. 4 is a sequence diagram showing an overview of a process sequence by the electrically driven cart and the external terminal device.

FIG. 4 is a sequence diagram showing an overview of a process sequence by the electrically driven cart 100 and the external terminal device 200. The electrically driven cart 100, first, acquires subsequent prospective traveling information, then acquires remaining amount information about a battery 2, and thereafter, determines, based on the prospective traveling information and the remaining amount information, whether charging of the battery 2 is necessary. The electrically driven cart 100 executes the forbidding control when the charging is necessary, and sends a forbidding notification to the external terminal device 200.

The external terminal device 200 notifies an owner thereof that the forbidding control is executed when receiving the forbidding notification from the electrically driven cart 100. The owner inputs a lock release instruction to the external terminal device 200 after sufficiently charging the battery 2. Subsequently, the external terminal device 200 sends the lock release instruction to the electrically driven cart 100 when receiving the input of the lock release instruction from the owner.

The electrically driven cart 100 executes the permission control when receiving the lock release instruction from the external terminal device 200.

Figure 5:
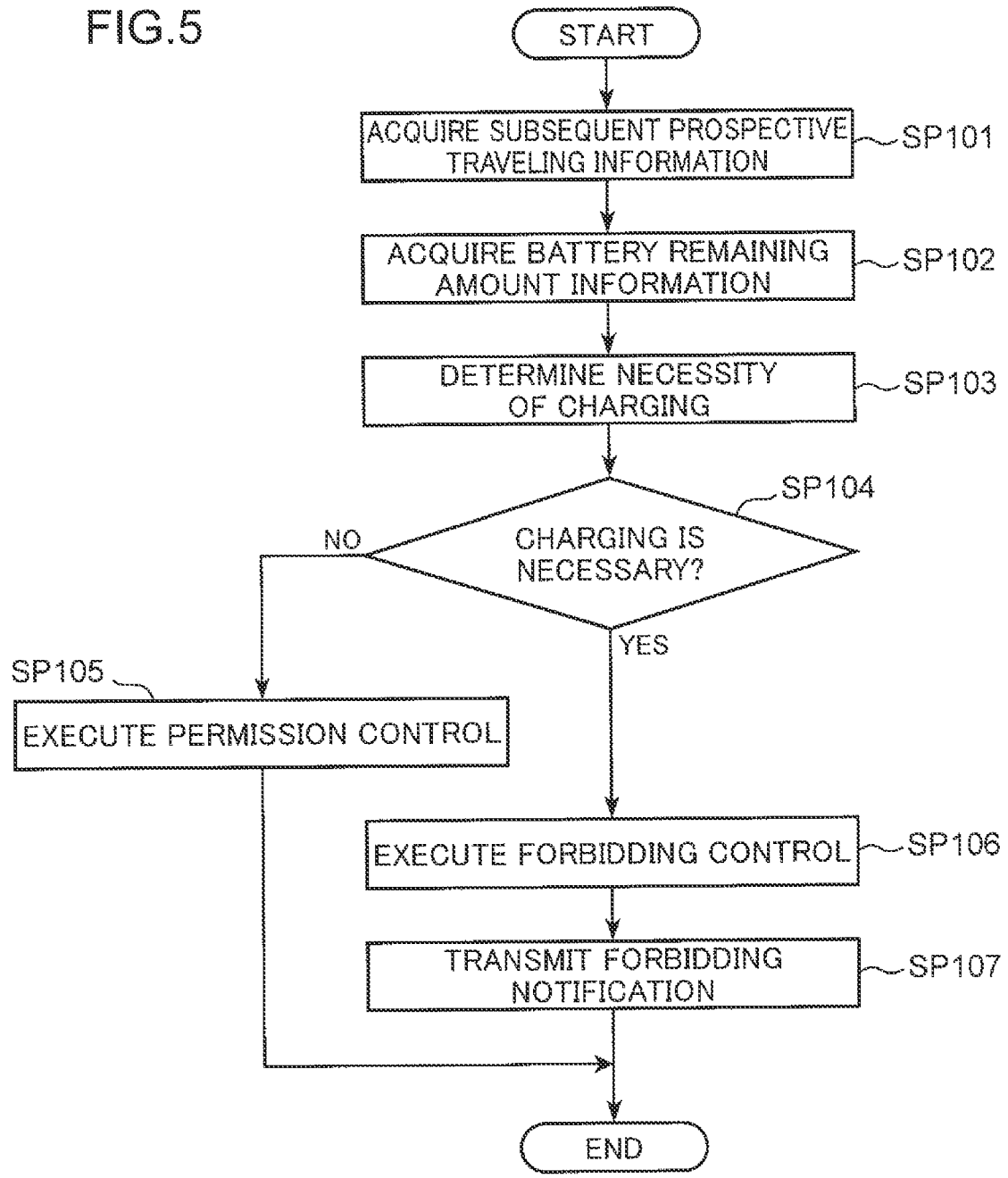
FIG. 5 is a flowchart showing contents of steps until transmission of a forbidding notification, in the process sequence shown in FIG. 4, as executed in the electrically driven cart.

FIG. 5 is a flowchart showing contents of steps until transmission of the forbidding notification, in the process sequence shown in FIG. 4, as executed in the electrically driven cart 100.

First, in step SP101, the traveling information acquisition part 13 acquires subsequent (in the following example, the next day's) prospective traveling information about the electrically driven cart 100 at a specific time (e.g., at 21 o'clock) every day with reference to the movement schedule 60 stored in the memory 12. The prospective traveling information includes information about a prospective power consumption amount. Meanwhile, management on an event basis is available in place of the management on the day basis. In this case, prospective traveling information about a subsequent event is acquired every time one event is finished.

Next, in step SP102, the remaining amount information acquisition part 14 acquires, from the battery 2, battery remaining amount information indicating a current remaining amount of the battery 2.

Subsequently, in step SP103, the determination section 21 determines, based on the prospective traveling information input from the traveling information acquisition part 13 and the battery remaining amount information input from the remaining amount information acquisition part 14, whether the charging of the battery 2 is necessary.

Specifically, in step SP104, the determination section 21 compares the prospective power consumption amount included in the prospective traveling information input from the traveling information acquisition part 13 with the battery remaining amount information input from the remaining amount information acquisition part 14. The determination section 21 determines that the charging is necessary when the prospective power consumption amount is equal to or larger than the battery remaining amount, and determines that the charging is unnecessary when the prospective power consumption amount is smaller than the battery remaining amount.

When the determination section 21 determines that the charging is unnecessary (NO in step PS104), the control section 22 executes, in the subsequent step SP105, the permission control of permitting the traveling motor 4 to drive by permitting the battery 2 to supply an electric power to the traveling motor 4 in subsequent turning-on of the power source of the electrically driven cart 100.

When the determination section 21 determines that the charging is necessary (YES in step PS104), the control section 22 executes, in the subsequent step SP106, the forbidding control of forbidding the traveling motor 4 from driving by forbidding the battery 2 from supplying the electric power to the traveling motor 4 in the subsequent turning-on of the power source of the electrically driven cart 100. When the control section 22 executes the forbidding control, the information output part 16 outputs notification information indicating that the control section 22 executes the forbidding control.

Figure 6:
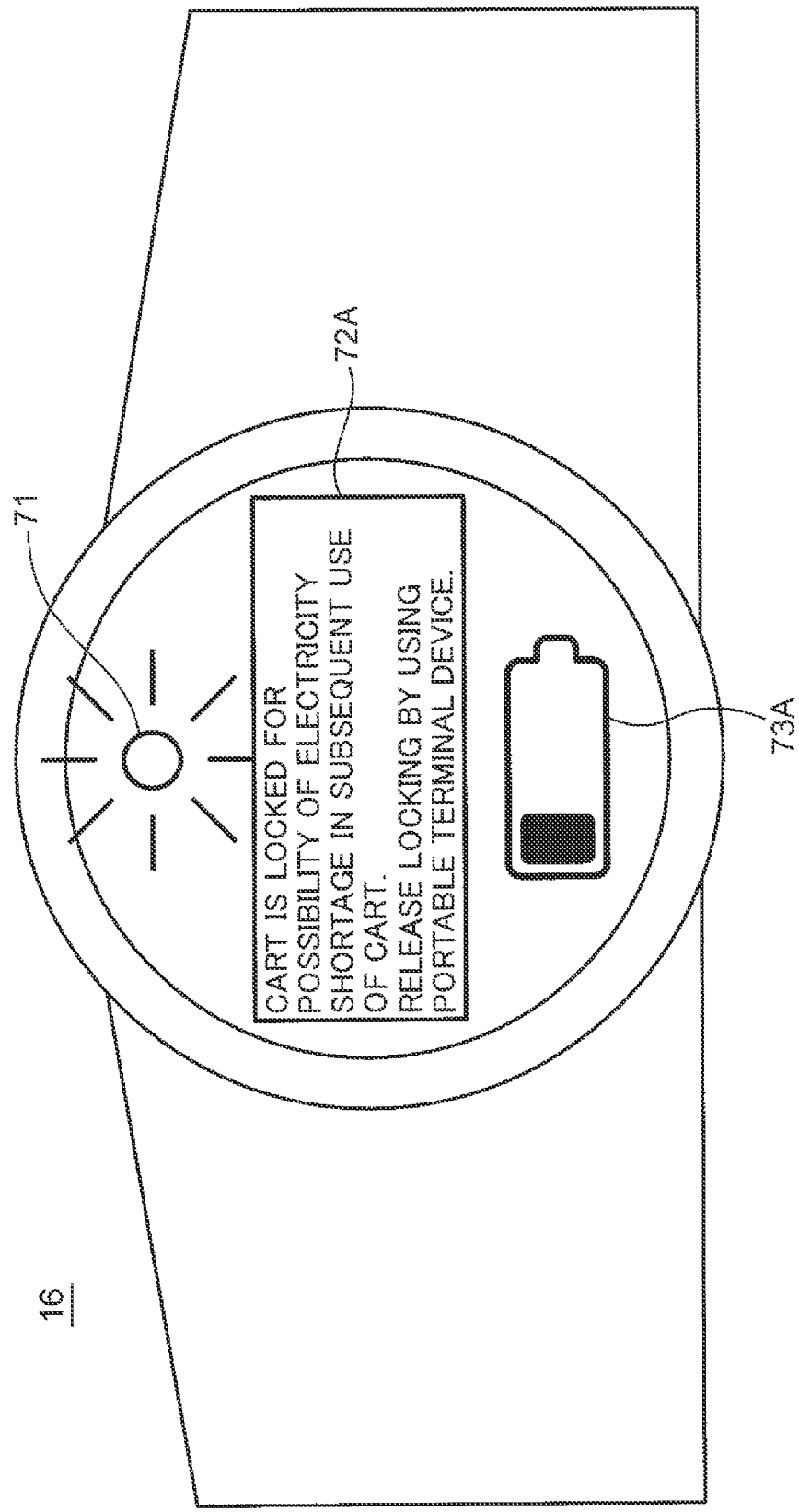
FIG. 6 shows an example of an output state of notification information from an information output part.

FIG. 6 shows an example of an output state of the notification information from the information output part 16. In the notification of the forbidding control, the information output part 16 causes a warning lamp 71 indicating a locked state to be turned on or flash on and off, displays a message 72A showing the locking of the electrically driven cart 100 and encouraging a lock release from the external terminal device 200, and further displays a shape 73A showing a poor remaining amount of the battery 2.

Referring to FIG. 5, the transmission section 31 transmits, in the subsequent step SP107, a forbidding notification indicating that the control section 22 starts to execute the forbidding control to the external terminal device 200.

Figure 7:
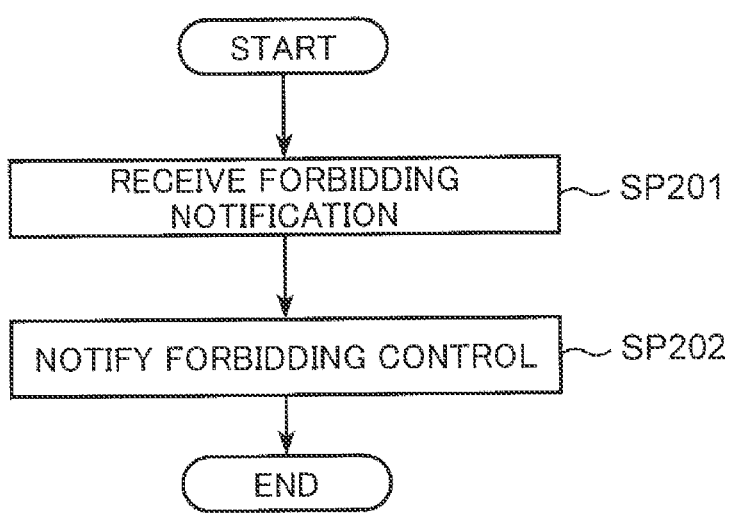
FIG. 7 is a flowchart showing contents of steps for a notification process of a forbidding control, in the process sequence shown in FIG. 4, as executed in the external terminal device.

FIG. 7 is a flowchart showing contents of steps for a notification process of the forbidding control, in the process sequence shown in FIG. 4, as executed in the external terminal device 200.

First, in step SP201, the receipt section 52 receives the forbidding notification transmitted from the transmission section 31 of the electrically driven cart 100. The receipt section 52 inputs the received forbidding notification to the management part 41.

Next, in step SP202, the management part 41 controls the information notification part 42 to thereby cause the information notification part 42 to output notification information for notifying the owner of the external terminal device 200 that the control section 22 executes the forbidding control.

Figure 8:
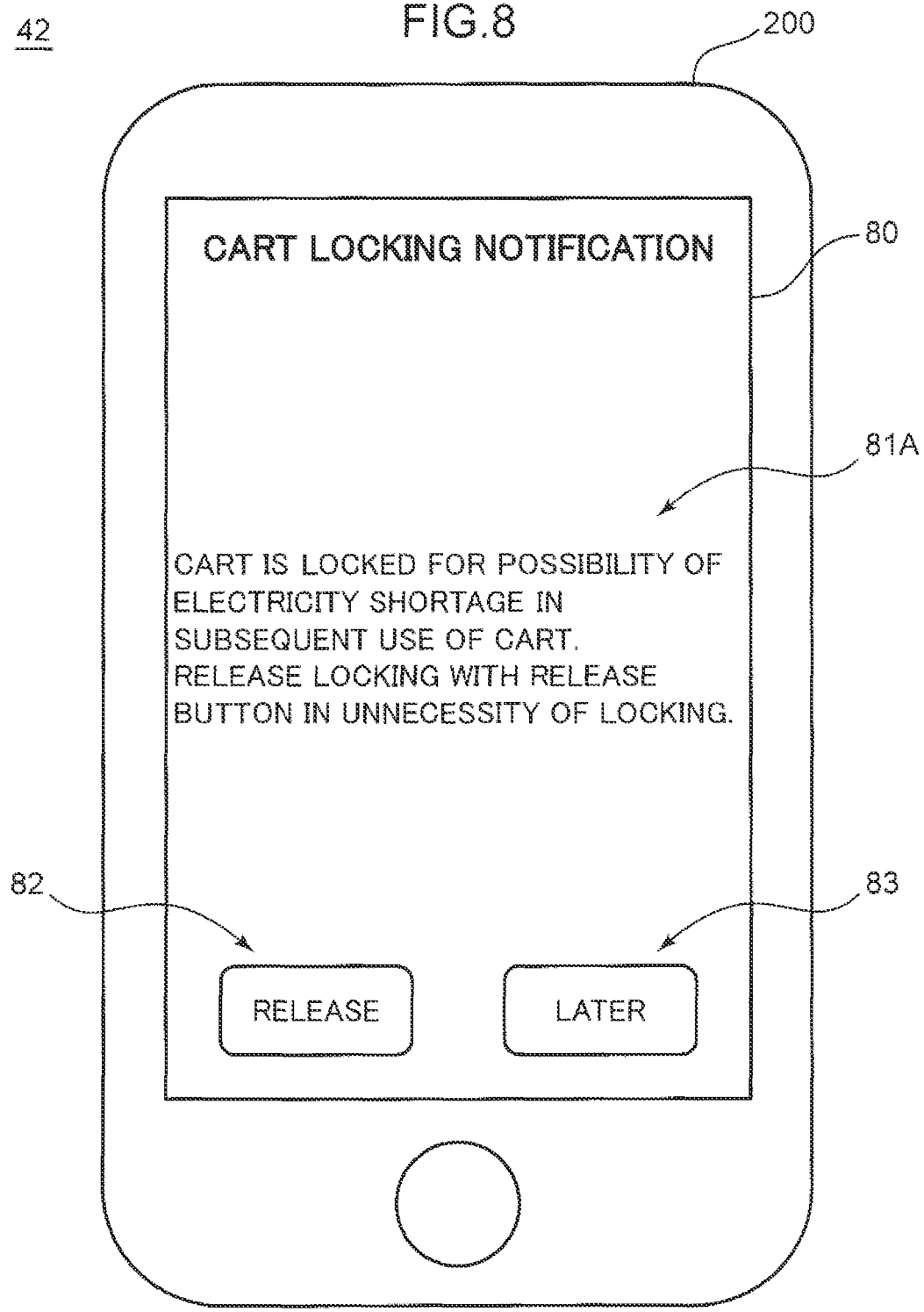
FIG. 8 shows an example of an output state of notification information from an information notification part.

FIG. 8 shows an example of an output state of the notification information from the information notification part 42. The information notification part 42 displays, on the liquid crystal display 80, a message 81A showing the locking of the electrically driven cart 100 and encouraging a lock release, and further displays, on the liquid crystal display 80, a lock release button 82 and a release pending button 83.

Figure 9:
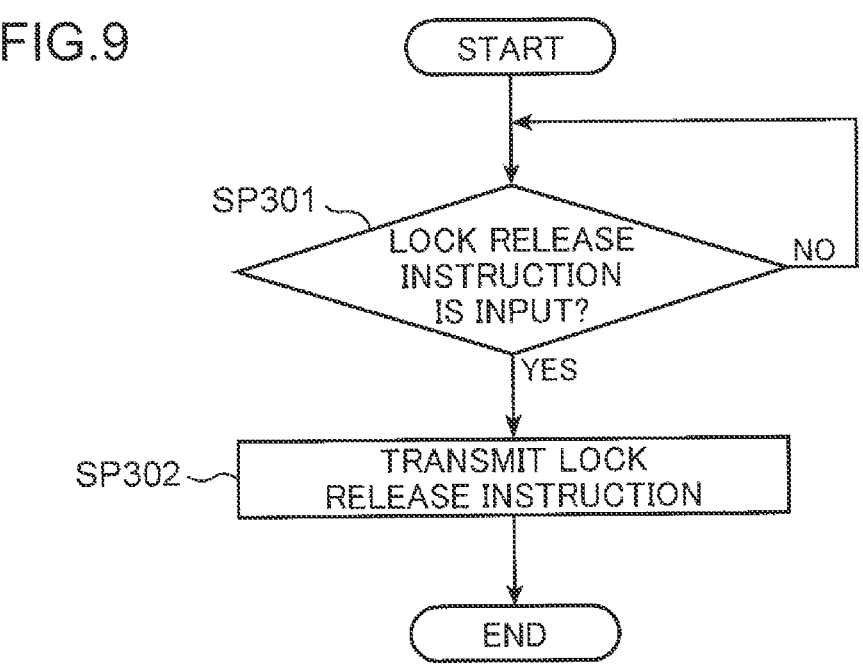
FIG. 9 is a flowchart showing contents of steps until transmission of a lock release instruction, in the process sequence shown in FIG. 4, as executed in the external terminal device.

FIG. 9 is a flowchart showing contents of steps until transmission of a lock release instruction, in the process sequence shown in FIG. 4, as executed in the external terminal device 200.

The owner of the external terminal device 200 charges the battery 2 of the electrically driven cart 100 in response to the notification information shown in FIG. 8. For instance, the charging and discharging controller 3 starts the charging of the battery 2 when an outlet of the user's house and the main body of the electrically driven cart 100 are connected to each other with a charging cable, and finishes the charging when the battery is fully charged. The owner of the external terminal device 200 taps the lock release button 82 after a completion of the charging. The manipulation input part 43 receives an input of a lock release instruction in response to the tapping of the lock release button 82. The manipulation input part 43 inputs the lock release instruction to the management part 41.

The management part 41 awaits the input of the lock release instruction from the manipulation input part 43. When receiving the input of the lock release instruction from the manipulation input part 43 (YES in step SP301), the management part 41 controls the transmission section 51 to transmit the lock release instruction to the electrically driven cart 100 in the subsequent step SP302.

Figure 10:
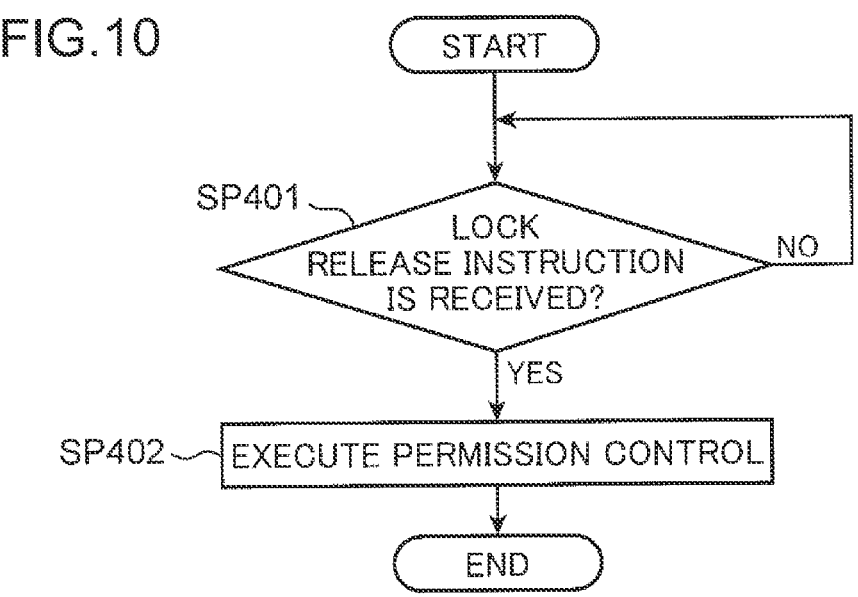
FIG. 10 is a flowchart showing contents of steps for execution of a permission control, in the process sequence shown in FIG. 4, as executed in the electrically driven cart.

FIG. 10 is a flowchart showing contents of steps for execution of the permission control, in the process sequence shown in FIG. 4, as executed in the electrically driven cart 100.

The receipt section 32 awaits receipt of the lock release instruction from the external terminal device 200. When receiving the lock release instruction transmitted from the transmission section 51 of the external terminal device 200 (YES in step S401), the receipt section 32 inputs the received lock release instruction to the control section 22.

The control section 22 executes, in the subsequent step SP402, the permission control of permitting the traveling motor 4 to drive in response to the input of the lock release instruction from the receipt section 32. When the control section 22 executes the permission control, the information output part 16 outputs notification information indicating that the control section 22 executes the permission control.

Figure 11:
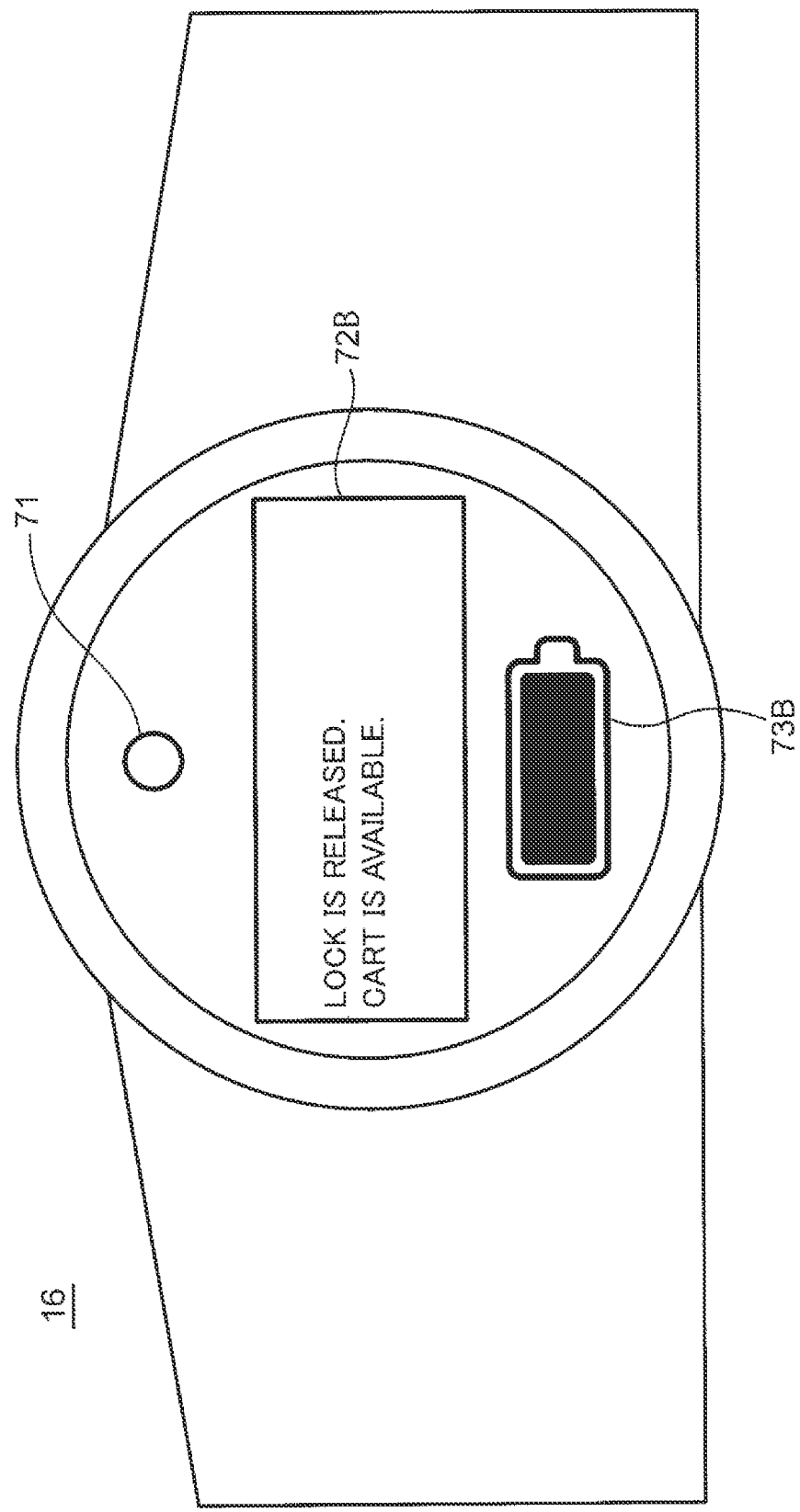
FIG. 11 shows an example of the output state of the notification information from the information output part.

FIG. 11 shows an example of an output state of the notification information from the information output part 16. In the notification of the permission control, the information output part 16 causes the warning lamp 71 to be turned off, displays a message 72B showing release of the locking, and further displays a shape 73B showing a sufficient remaining amount of the battery 2.

Figure 12:
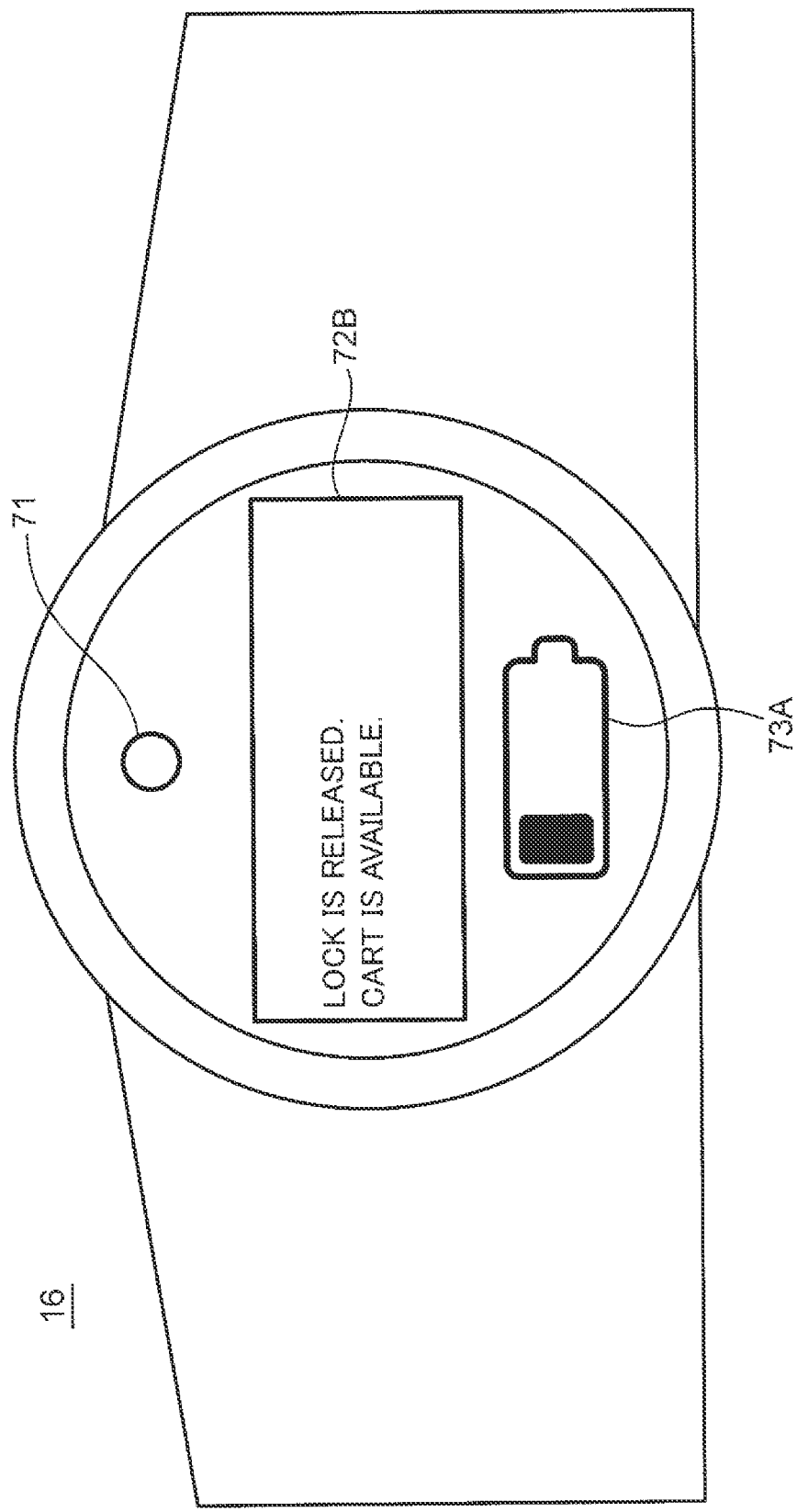
FIG. 12 shows an example of the output state of the notification information from the information output part.

In the description heretofore, the owner of the external terminal device 200 inputs the lock release instruction from the manipulation input part 43 after charging the battery 2 of the electrically driven cart 100. However, the configuration is not limited thereto, and the owner can input the lock release instruction from the manipulation input part 43 without charging the battery 2 when the electrically driven cart 100 is used for a movement at a shorter distance that is different from the movement pattern shown in the movement schedule 60. In the same manner as described above, the external terminal device 200 sends the lock release instruction to the electrically driven cart 100, and the control section 22 executes the permission control. FIG. 12 shows an example of an output state of the notification information from the information output part 16. In the notification of the permission control without the charging of the battery 2, the information output part 16 causes the warning lamp 71 to be turned off, displays a message 72B showing release of the locking, and further displays a shape 73A showing a poor remaining amount of the battery 2.

In the use management device 1 according to the embodiment, the determination section 21 determines, based on the prospective traveling information and the remaining amount information, whether the charging of the battery 2 is necessary, and the control section 22 executes the forbidding control of forbidding the traveling motor 4 from driving when the determination section 21 determines that the charging of the battery 2 is necessary. As described above, an occurrence of the electricity shortage of the electrically driven cart 100 outside is easily and effectively preventable by forbidding the traveling motor 4 from driving, and imposing a restriction on outings when the charging of the battery 2 is determined to be necessary, based on the prospective traveling information and the remaining amount information.

Furthermore, the forbidding notification is sent to the external terminal device 200 (e.g., a portable terminal device of a family member) registered in advance, and thus the owner of the external terminal device 200 having received the forbidding notification can perform the work of charging the battery 2. Moreover, the external terminal device 200 sends the lock release instruction at a completion of the charging of the battery 2, and the control section 22 executes the permission control when the receipt section 32 of the electrically driven cart 100 receives the lock release instruction. Consequently, the user can use the electrically driven cart 100.

The information output part 16 outputs the notification information indicating that the control section 22 executes the forbidding control. Accordingly, the user having confirmed the notification information can recognize no malfunction of the electrically driven cart 100 despite no driving of the traveling motor 4.

The traveling information acquisition part 13 acquires, based on the movement schedule 60 (movement pattern information) stored in the memory 12 (information storage part), the prospective traveling information. The electrically driven cart 100 is used in a limited living area around the house of the user as transportation in a daily life in many cases. Hence, a movement pattern including a destination and a day of week is fixed to some extent. Consequently, the movement schedule 60 representing the movement pattern can be created in advance, and the traveling information acquisition part 13 can acquire correct prospective traveling information conforming to the movement pattern of the user with reference to the movement schedule 60.

First Modification

Figure 13:
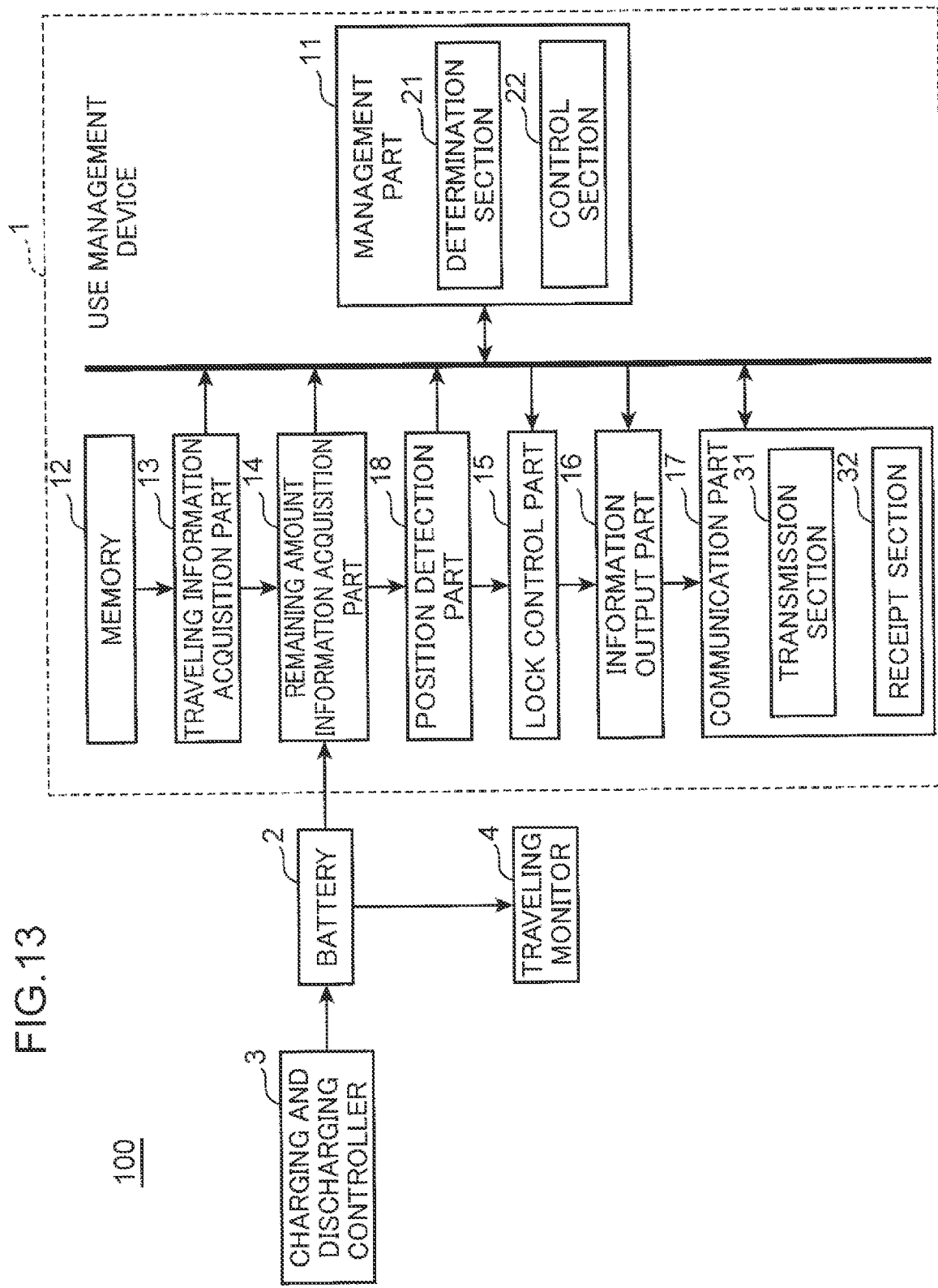
FIG. 13 is a block diagram showing a simplified configuration of a use management device for an electrically driven cart according to a first modification.

FIG. 13 is a block diagram showing a simplified configuration of a use management device 1 for an electrically driven cart according to a first modification. This configuration additionally includes a position detection part 18 like a GPS receiver in comparison with the configuration shown in FIG. 1.

Figure 14:
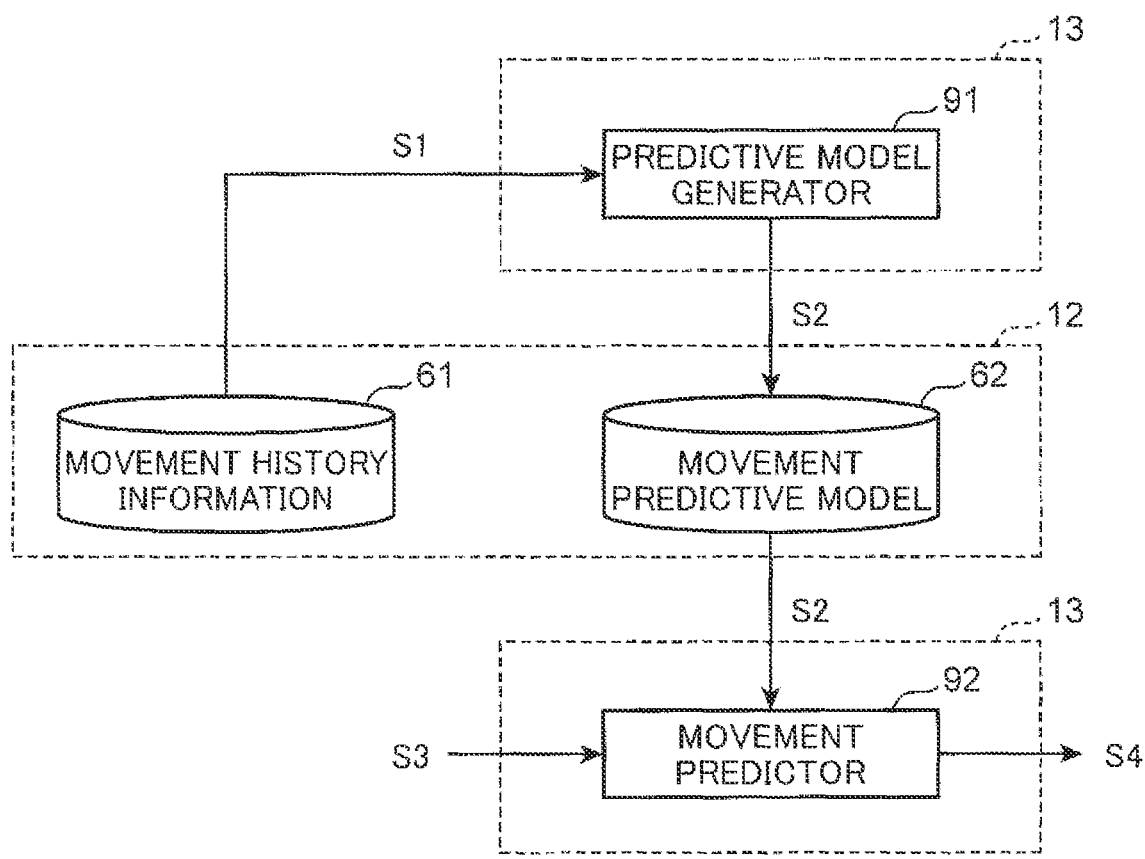
FIG. 14 shows a configuration including a memory and a traveling information acquisition part.

FIG. 14 shows a configuration including a memory 12 and a traveling information acquisition part 13. The memory 12 stores movement history information 61 and a movement predictive model 62. The traveling information acquisition part 13 includes a predictive model generator 91 and a movement predictor 92.

When use of an electrically driven cart 100 on one day is finished, a dataset about a destination, a use time (a day of week and a time slot), a traveling distance, and a power consumption amount for each event conducted on that day is accumulated as the movement history information 61 in the memory 12. The destination is represented by a facility name or position coordinate information about a longitude and a latitude as detected by the position detection part 18. Datasets thus obtained are collected per day of week and time slot. In this way, the movement history information 61 like the movement schedule 60 shown in FIG. 3 can be created.

The predictive model generator 91 receives an input of accumulated datasets of the movement history information 61 serving as learning data S1. The predictive model generator 91 creates the movement predictive model 62 for predicting the movement of the electrically driven cart 100 by machine learning, such as deep learning using a neutral network, and the memory 12 stores data S2 relevant thereto. For instance, the predictive model generator 91 receives an input of a combination of movement history information 61 on continuous two days. The predictive model generator 91 performs the machine learning by defining the movement history information 61 on the first day as an explanatory variable and defining the movement history information 61 on the second day as an objective variable. This leads to a success in creating the movement predictive model 62 for predicting a movement (prospective traveling distance and prospective power consumption amount) on a next day when the movement history information 61 on one day is input. Meanwhile, management on an event basis is available in place of the management on the day basis. In this case, a departure time or a getting-home time is used as the use time in place of the time slot.

As described above, the traveling information acquisition part 13 acquires, at a specific time (e.g., 21:00) every day, subsequent prospective traveling information on the next day about the electrically driven cart 100. The movement predictor 92 receives an input of day-of-week data S3 on the one day as current time information. The movement predictor 92 predicts the movement (prospective traveling distance and prospective power consumption amount) about the movement on the next day of the one day of week represented by the day-of-week data S3 with reference to the movement predictive model 62, and outputs predictive data S4 relevant thereto.

When a control section 22 starts to execute a forbidding control, a transmission section 31 included in the electrically driven cart 100 transmits, to an external terminal device 200, movement prospective information (a destination, a prospective traveling distance, and a prospective power consumption amount) on the next day about the electrically driven cart 100, and current state information (a remaining amount and a travelable distance) about a battery 2 together with a forbidding notification as mentioned above. An information notification part 42 included in the external terminal device 200 outputs notification information forgiving notification that the control section 22 executes the forbidding control.

Figure 15:
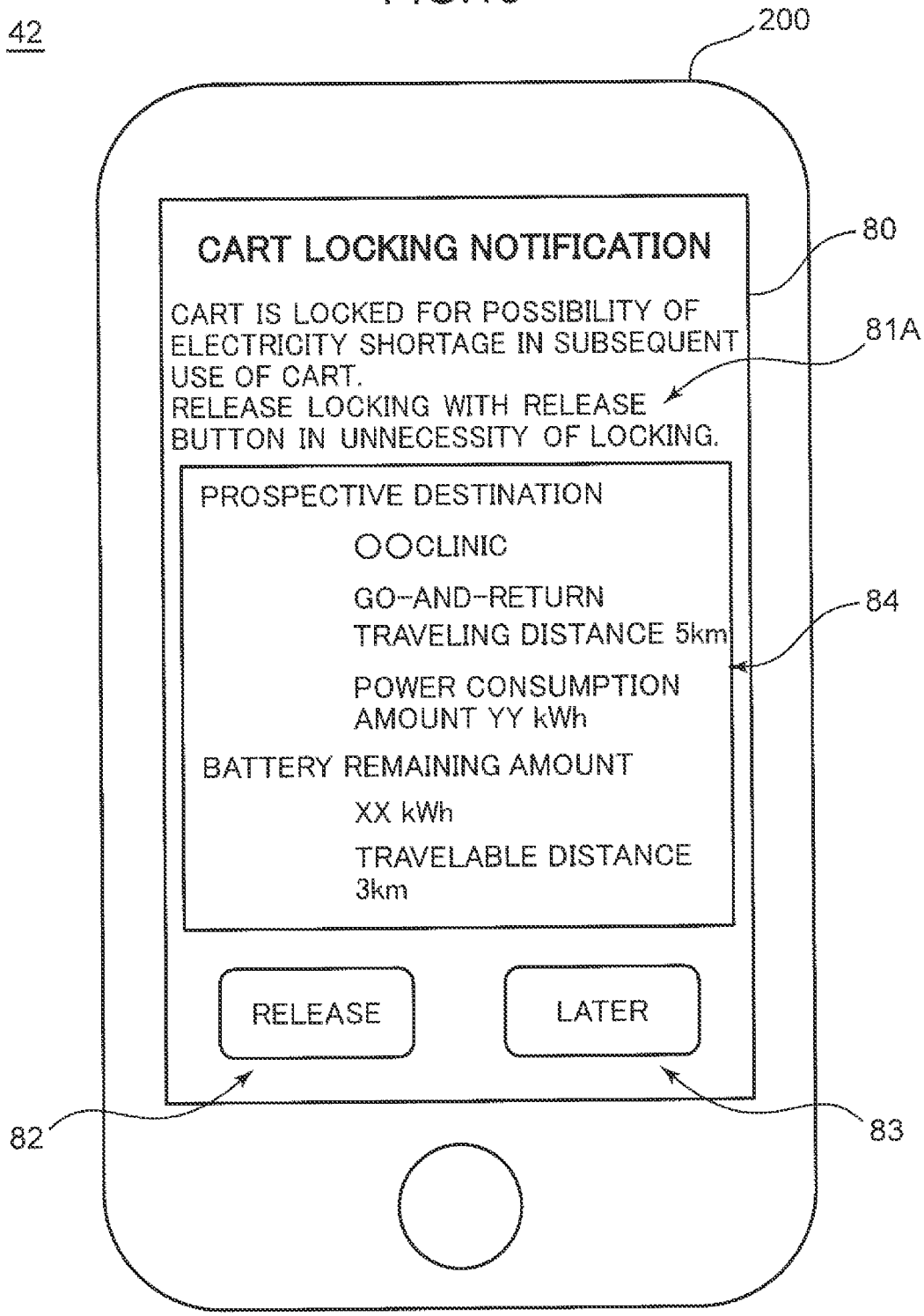
FIG. 15 shows an example of an output state of notification information from an information notification part.
Figure 16:
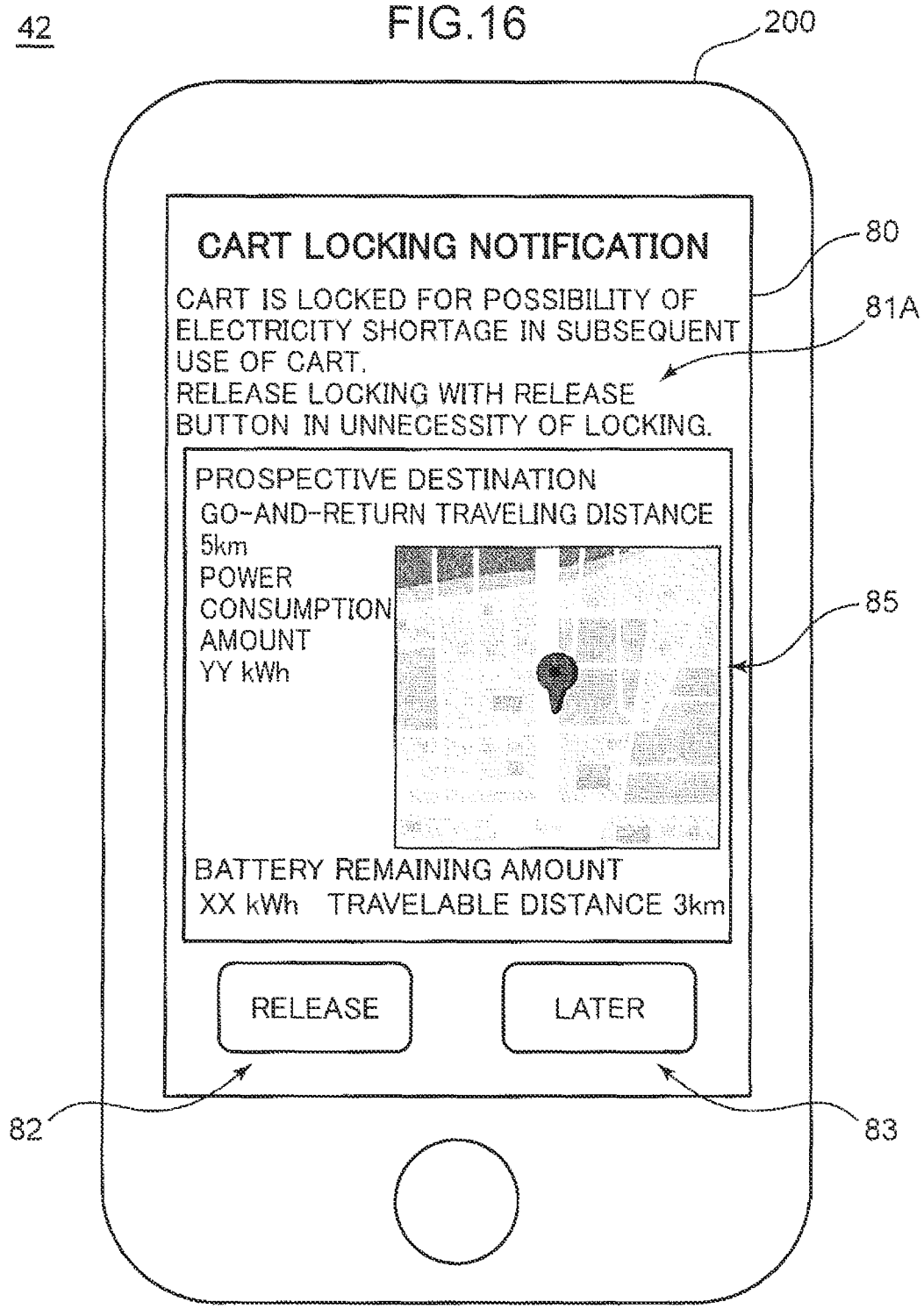
FIG. 16 shows an example of the output state of the notification information from the information notification part.

Each of FIGS. 15 and 16 shows an example of an output state of the notification information from the information notification part 42. In the example shown in FIG. 15, the information notification part 42 displays, on a liquid crystal display 80, a message 81A showing locking of the electrically driven cart 100 and encouraging a lock release, a lock release button 82 and a release pending button 83, and text information 84 representing movement prospective information on the next day about the electrically driven cart 100 and the current state information of the battery 2. A facility name is displayed as the information about the destination.

In the example shown in FIG. 16, the information notification part 42 displays, on the liquid crystal display 80, a message 81A, a lock release button 82, and a release pending button 83 like those in FIG. 15, and image information 85 representing movement prospective information on the next day about the electrically driven cart 100 and the current state information about the battery 2. Map information showing a location of the destination by a pointer is displayed as the destination information.

According to this modification, the transmission section 31 of the electrically driven cart 100 transmits, to the external terminal device 200, a prospective traveling distance and a prospective power consumption amount of the electrically driven cart 100, and a current remaining amount of the battery 2 and a travelable distance. The information notification part 42 of the external terminal device 200 notifies the owner of the external terminal device 200 of information thereabout. This configuration allows the owner to explicitly recognize a possibility of the electricity shortage of the electrically driven cart 100, and thus can encourage the owner to rapidly perform a work of charging the battery 2.

Second Modification

Figure 17:
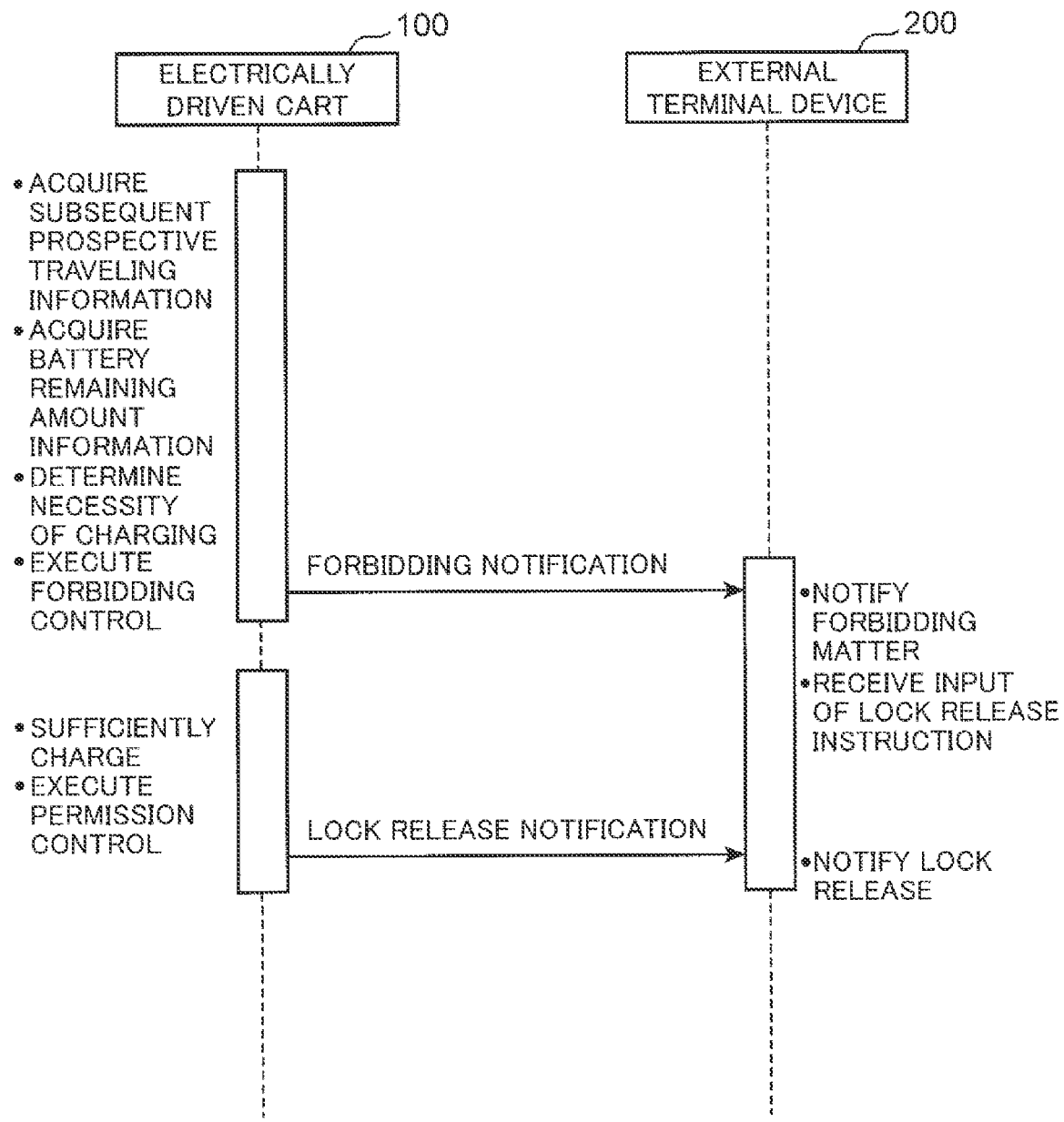
FIG. 17 is a sequence diagram showing an overview of a process sequence by an electrically driven cart and an external terminal device.

FIG. 17 is a sequence diagram showing an overview of a process sequence by an electrically driven cart 100 and an external terminal device 200. The electrically driven cart 100, first, acquires subsequent prospective traveling information, then acquires remaining amount information about a battery 2, and thereafter, determines, based on the prospective traveling information and the remaining amount information, whether charging of the battery 2 is necessary.

The electrically driven cart 100 executes a forbidding control when the charging is necessary, and sends a forbidding notification to the external terminal device 200.

The external terminal device 200 notifies an owner thereof that the forbidding control is executed when receiving the forbidding notification from the electrically driven cart 100. Subsequently, the external terminal device 200 awaits an input of a lock release instruction from the owner.

The electrically driven cart 100 awaits sufficient charging of the battery 2 or receipt of the lock release instruction from the external terminal device 200 after sending the forbidding notification. The electrically driven cart 100 executes a permission control and sends a lock release notification to the external terminal device 200 in a case where the battery 2 is sufficiently charged before the electrically driven cart 100 receives the lock release instruction from the external terminal device 200.

The external terminal device 200 notifies the owner of release of the locking of the electrically driven cart 100 when receiving the lock release notification from the electrically driven cart 100.

Hereinafter, the difference from the embodiment will be mainly described.

In the same manner as the embodiment, when a control section 22 executes the forbidding control, an information output part 16 outputs notification information indicating that the control section 22 executes the forbidding control.

Figure 18:
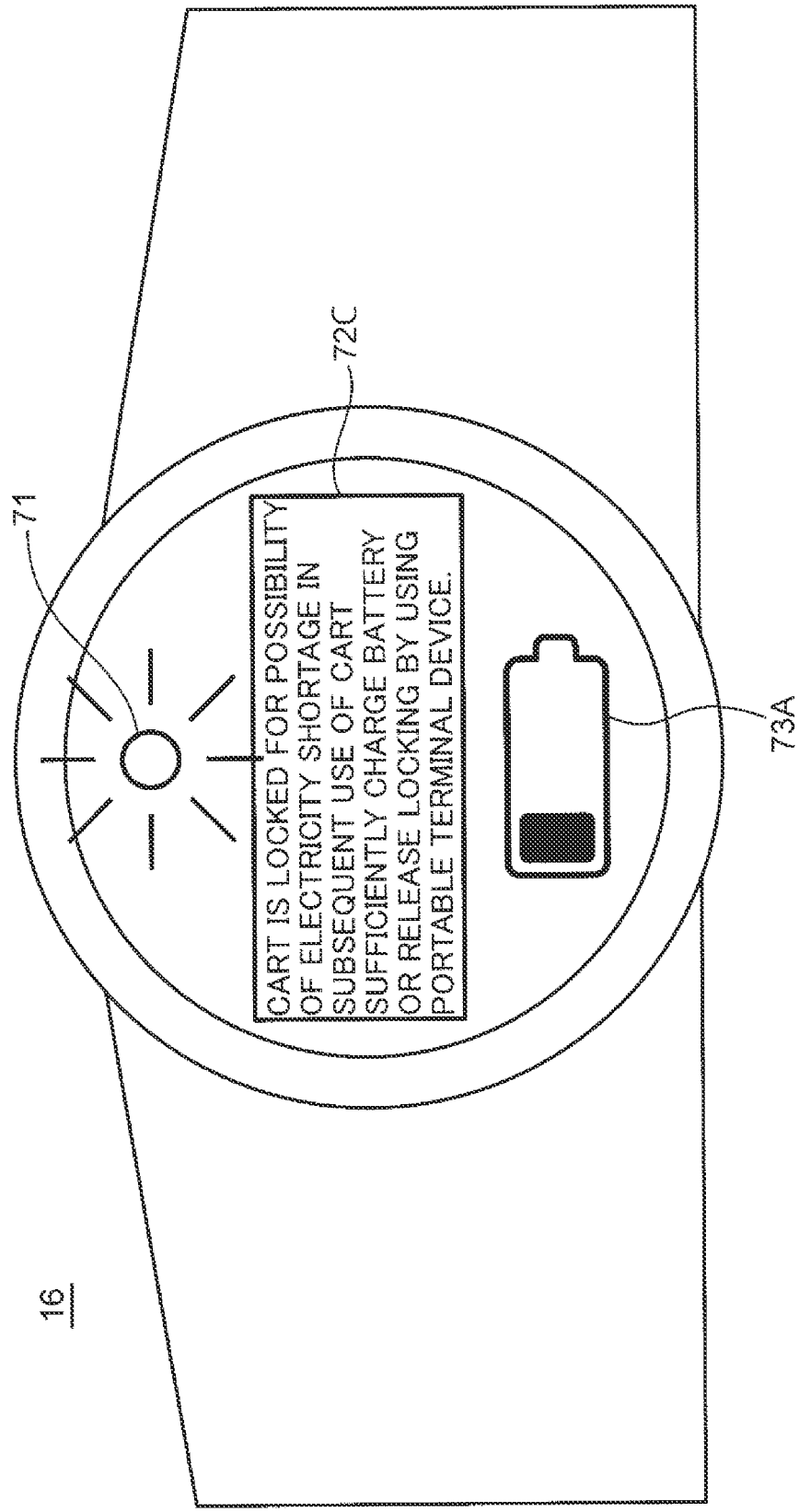
FIG. 18 shows an example of an output state of notification information from an information output part.

FIG. 18 shows an example of an output state of the notification information from the information output part 16. In the notification of the forbidding control, the information output part 16 causes a warning lamp 71 indicating a locked state to be turned on or flash on and off, displays a message 72C showing the locking of the electrically driven cart 100, and encouraging charging of the battery 2 or encouraging a lock release from the external terminal device 200, and further displays a shape 73A showing a poor remaining amount of the battery 2.

Besides, in the same manner as the embodiment, when the control section 22 starts to execute the forbidding control, a transmission section 31 included in the electrically driven cart 100 transmits a forbidding notification to the external terminal device 200, and an information notification part 42 included in the external terminal device 200 outputs notification information for giving notification that the control section 22 executes the forbidding control.

Figure 19:
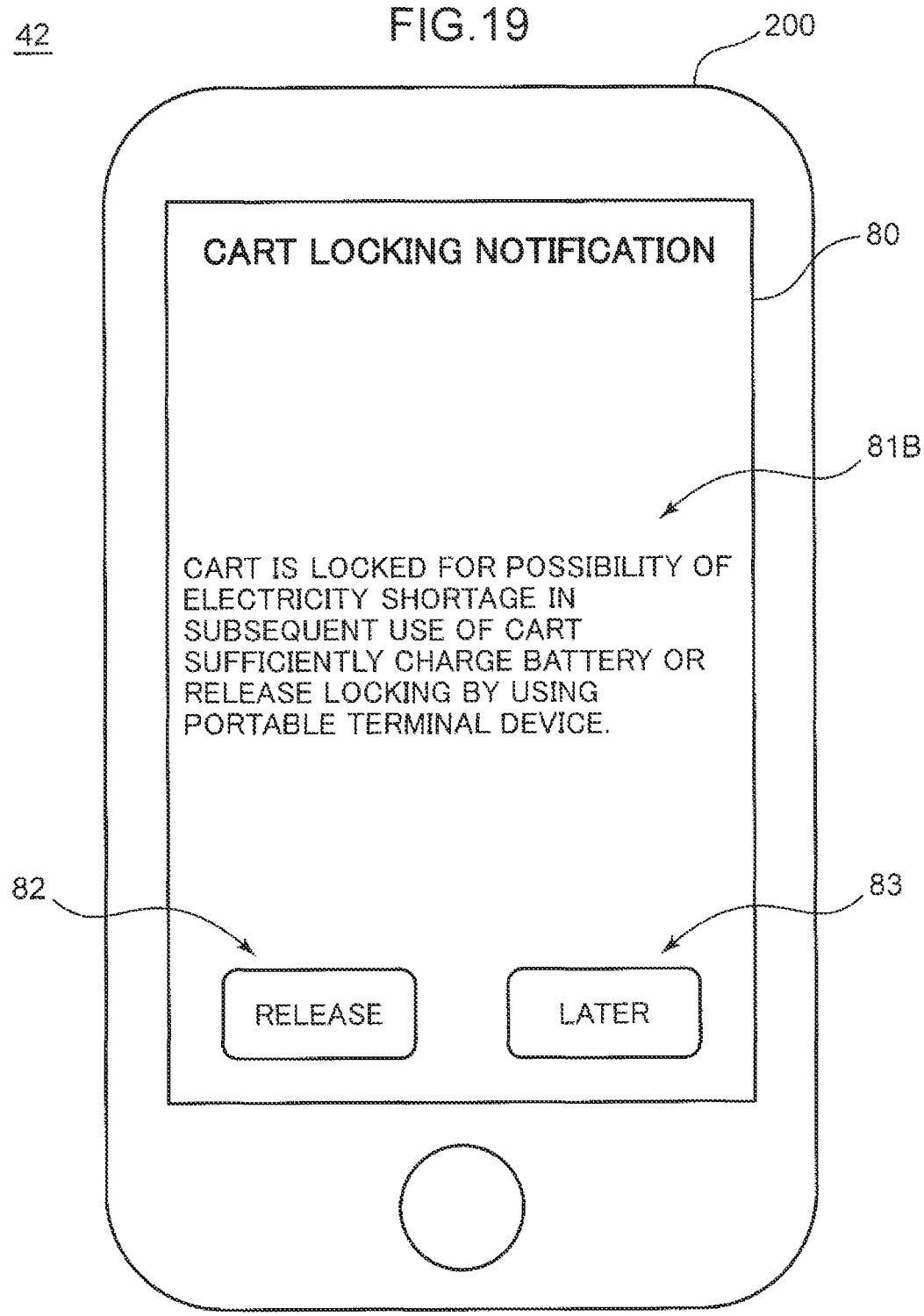
FIG. 19 shows an example of an output state of notification information from an information notification part.

FIG. 19 shows an example of an output state of the notification information from the information notification part 42. The information notification part 42 displays, on a liquid crystal display 80, a message 81B showing the locking of the electrically driven cart 100, and encouraging charging of the battery 2 or a lock release, a lock release button 82, and a release pending button 83.

Figure 20:
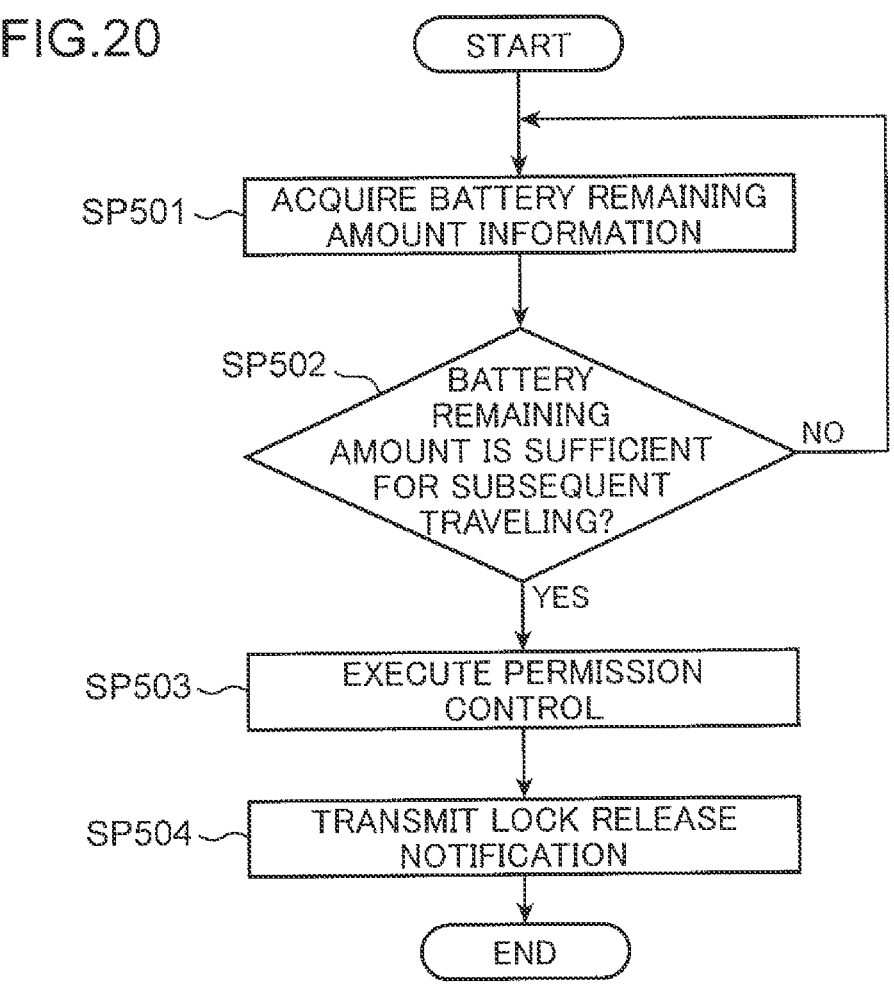
FIG. 20 is a flowchart showing contents of steps for execution of a permission control, in the process sequence shown in FIG. 17, as executed in the electrically driven cart.

FIG. 20 is a flowchart showing contents of steps for execution of a permission control, in the process sequence shown in FIG. 17, as executed in the electrically driven cart 100.

After the control section 22 starts to execute the forbidding control, a remaining amount information acquisition part 14 acquires, from the battery 2, battery remaining amount information indicating a current remaining amount of the battery 2 in step SPS01.

In the subsequent step SP502, a determination section 21 determines, based on prospective traveling information input from a traveling information acquisition part 13 and the battery remaining amount information input from the remaining amount information acquisition part 14, whether the battery remaining amount is sufficient for subsequent traveling, that is, whether the current remaining amount of the battery 2 is equal to or larger than a prospective power consumption amount for the subsequent (in this example, the next day's) traveling of the electrically driven cart 100.

When the battery remaining amount is insufficient for the subsequent traveling (NO in step SP502), steps SP501 and SP502 are repetitively executed until the battery 2 is sufficiently charged (or until receipt of the lock release instruction from the external terminal device 200).

When the battery remaining amount is sufficient for the subsequent traveling (YES in step S502), the control section 22 executes, in the subsequent step SP503, a permission control of permitting a traveling motor 4 to drive in response to the sufficient charging of the battery 2 for the subsequent traveling. When the control section 22 executes the permission control, the information output part 16 outputs notification information indicating that the control section 22 executes the permission control. The transmission section 31 transmits, to the external terminal device 200, a lock release notification for giving notification that the locking is released under the permission control.

Figure 21:
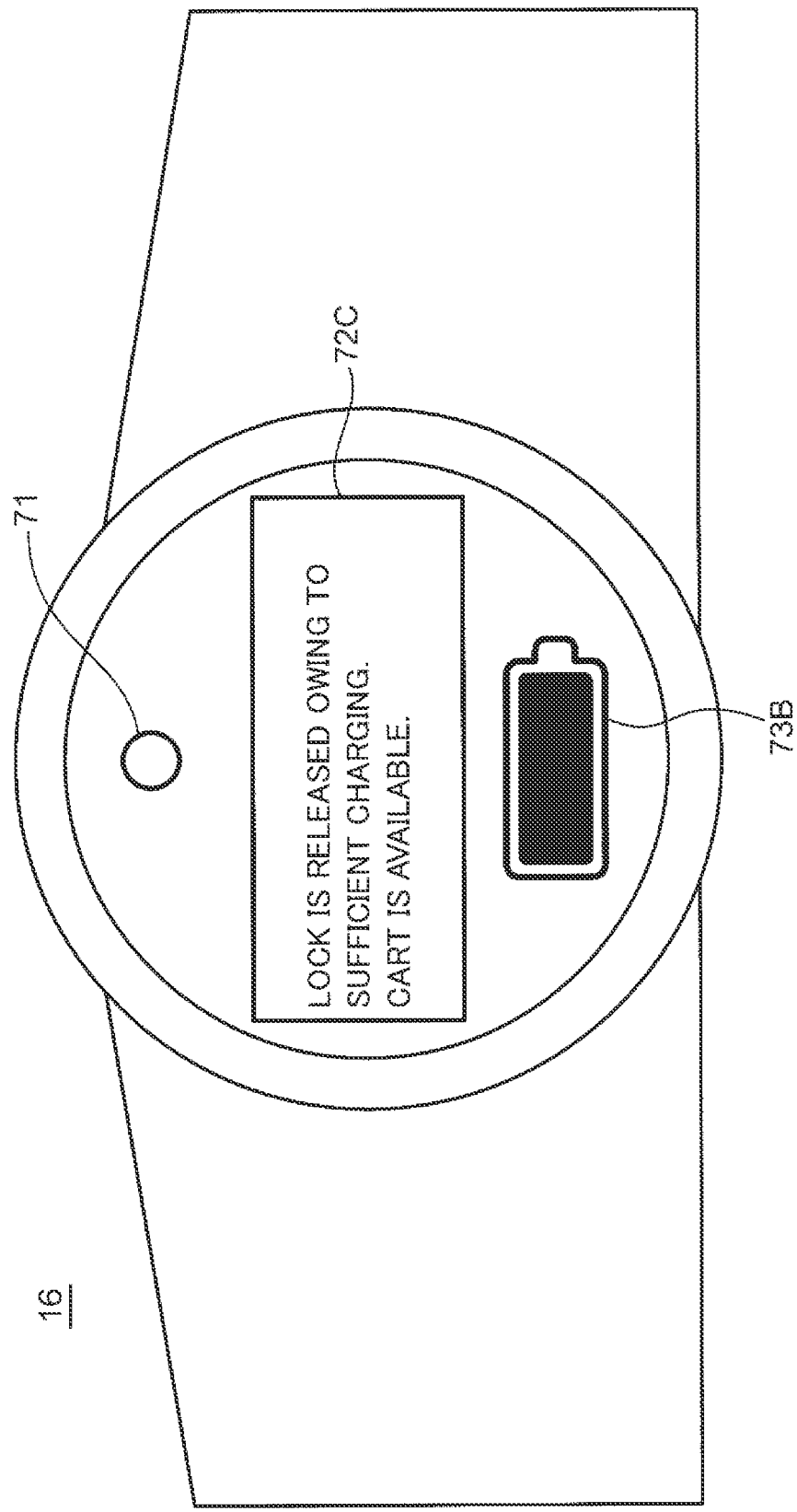
FIG. 21 shows an example of an output state of notification information from the information output part.

FIG. 21 shows an example of an output state of the notification information from the information output part 16. In the notification of the permission control, the information output part 16 causes the warning lamp 71 to be turned off, displays a message 72C showing release of the locking owing to sufficient charging of the battery 2, and further displays a shape 73B showing a sufficient remaining amount of the battery 2.

Figure 22:
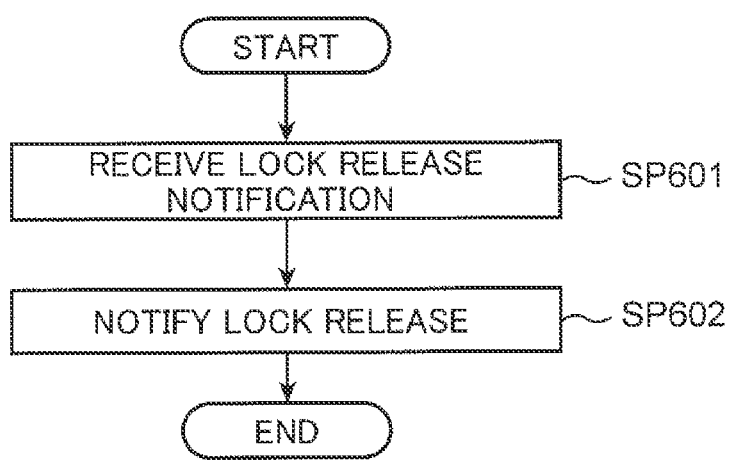
FIG. 22 is a flowchart showing contents of steps for notification of a lock release, in the process sequence shown in FIG. 17, as executed in the external terminal device.

FIG. 22 is a flowchart showing contents of steps for notification of the lock release, in the process sequence shown in FIG. 17, as executed in the external terminal device 200.

First, in step SP601, a receipt section 52 receives the lock release notification transmitted from the transmission section 31 of the electrically driven cart 100. The receipt section 52 inputs the received lock release notification to a management part 41.

Next, in step SP602, the management part 41 controls the information notification part 42 to thereby cause the information notification part 42 to output notification information for notifying an owner of the external terminal device 200 that the locking of the electrically driven cart 100 is released.

FIG. 23 shows an example of an output state of the notification information from the information notification part 42. The information notification part 42 displays, on a liquid crystal display 80, a message 81C showing release of the locking owing to the sufficient charging of the battery 2, and a confirmation button 86.

According to the modification, when the remaining amount of the battery 2 reaches a subsequent prospective power consumption amount or larger owing to the charging, the control section 22 executes the permission control whether or not a receipt section 32 included in the electrically driven cart 100 receives the lock release instruction from the external terminal device 200. This configuration permits a user to use the electrically driven cart 100 when the battery 2 is sufficiently charged even without receiving the lock release instruction from the external terminal device 200 due to, for example, a communication error.

INDUSTRIAL APPLICABILITY

A use management technology according to this disclosure is particularly applicable to management of a remaining amount of a battery of an electrically driven cart, such as a senior car (registered trademark) or an electric wheel chair.

The invention claimed is:

1. A use management device for an electrically driven cart including a traveling motor driven by an electric power supplied from a battery, the use management device comprising circuitry,
the circuitry being configured to
acquire subsequent prospective traveling information about the electrically driven cart,
acquire remaining amount information about the battery,
determine, based on the prospective traveling information and the remaining amount information, whether charging of the battery is necessary,
execute a permission control of permitting the traveling motor to drive when the charging of the battery is unnecessary, and execute a forbidding control of forbidding the traveling motor from driving when the charging of the battery is necessary,
receive a release instruction of releasing the forbidding control from an external terminal device registered in advance,
store movement pattern information created in advance about the electrically driven cart. and
when the forbidding control is being executed, receive the release instruction entered by omitting the battery charge for a move different from the movement pattern information from the external terminal device.

2. The use management device for an electrically driven cart according to claim 1, wherein the circuitry is configured to
transmit a forbidding notification indicating that the forbidding control is being executed to the external terminal device; and
execute the permission control when the release instruction is received.

3. The use management device for an electrically driven cart according to claim 2, wherein the circuitry is configured to
transmit to the external terminal device, a prospective traveling distance in subsequent traveling of the electrically driven cart and a travelable distance based on a current battery remaining amount.

4. The use management device for an electrically driven cart according to claim 2, wherein the circuitry is configured to
transmit, to the external terminal device, a prospective power consumption amount in subsequent traveling of the electrically driven cart and a current battery remaining amount.

5. The use management device for an electrically driven cart according to claim 1, wherein the circuitry is configured to
execute the permission control when a remaining amount of the battery reaches the prospective power consumption amount or larger in the subsequent traveling of the electrically driven cart, after starting the execution of the forbidding control.

6. The use management device for an electrically driven cart according to claim 1, wherein the circuitry is configured to
output notification information indicating that the forbidding control is being executed.

7. The use management device for an electrically driven cart according to claim 1, wherein the circuitry is configured to
acquire, based on the movement pattern information, the prospective traveling information.

8. The use management device for an electrically driven cart according to claim 1, wherein the circuitry is configured to
store a movement predictive model of the electrically driven cart created in advance, and
acquire, based on current time information and the movement predictive model, the prospective traveling information.

9. A use management system for an electrically driven cart including a traveling motor driven by an electric power supplied from a battery, the use management system comprising circuitry,
the circuitry being configured to
acquire subsequent prospective traveling information about the electrically driven cart,
acquire remaining amount information about the battery,
determine, based on the prospective traveling information and the remaining amount information, whether charging of the battery is necessary,
execute a permission control of permitting the traveling motor to drive when the charging of the battery is unnecessary, and execute a forbidding control of forbidding the traveling motor from driving when the charging of the battery is necessary,
receive a release instruction of releasing the forbidding control from an external terminal device registered in advance,
store movement pattern information created in advance about the electrically driven cart, and
when the forbidding control is being executed, receive the release instruction entered by omitting the battery charge for a move different from the movement pattern information from the external terminal device.

10. A non-transitory computer-readable recording medium recording a program for causing an information processor mounted on an electrically driven cart including a traveling motor driven by an electric power supplied from a battery to perform operations, the operations comprising:
acquiring subsequent prospective traveling information about the electrically driven cart;
acquiring remaining amount information about the battery;
determining, based on the prospective traveling information and the remaining amount information, whether charging of the battery is necessary;
executing a permission control of permitting the traveling motor to drive when the charging of the battery is unnecessary, and executing a forbidding control of forbidding the traveling motor from driving when the the charging of the battery is necessary;
receiving a release instruction of releasing the forbidding control from an external terminal device registered in advance;
storing movement pattern information created in advance about the electrically driven cart; and
when the forbidding control is being executed, receiving the release instruction entered by omitting the battery charge for a move different from the movement pattern information from the external terminal device.

11. A use management method for an electrically driven cart including a traveling motor driven by an electric power supplied from a battery, the use management method, by an information processor mounted on the electrically driven cart, comprising:
acquiring subsequent prospective traveling information about the electrically driven cart;

acquiring remaining amount information about the battery;

determining, based on the prospective traveling information and the remaining amount information, whether charging of the battery is necessary;

executing a permission control of permitting the traveling motor to drive when the charging is determined to be unnecessary, and executing a forbidding control of forbidding the traveling motor from driving when the charging of the battery is determined to be necessary;

receiving a release instruction of releasing the forbidding control from an external terminal device registered in advance;

storing movement pattern information created in advance about the electrically driven cart; and when the forbidding control is being executed, receiving the release instruction entered by omitting the battery charge for a move different from the movement pattern information from the external terminal device.

12. The use management device for an electrically driven cart according to claim 1, wherein
the move different from the movement pattern information includes a short distance travel.

13. The use management device for an electrically driven cart according to claim 1, wherein the circuitry is configured to
execute the permission control upon receipt of the release instruction entered by omitting the battery charge.

14. The use management device for an electrically driven cart according to claim 13, wherein the circuitry is configured to
output notification information indicating that the prohibition on the use of the electric cart has been released and that the remaining battery level is low, upon receipt of the release instruction entered by omitting the battery charge.

* * * * *